(12) United States Patent
Fiechtner et al.

(10) Patent No.: US 12,517,122 B2
(45) Date of Patent: Jan. 6, 2026

(54) LATERAL FLOW IMMUNOASSAY DEVICE WITH SEPARATION MEMBRANE

(71) Applicant: Becton, Dickinson and Company, Franklin Lakes, NJ (US)

(72) Inventors: Michael D. Fiechtner, Poway, CA (US); Francis R. Go, San Diego, CA (US); Scott Castanon, Carlsbad, CA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 17/159,589

(22) Filed: Jan. 27, 2021

(65) Prior Publication Data

US 2021/0148906 A1    May 20, 2021

Related U.S. Application Data

(63) Continuation of application No. PCT/US2019/044684, filed on Aug. 1, 2019.

(60) Provisional application No. 62/715,129, filed on Aug. 6, 2018.

(51) Int. Cl.
    *G01N 33/543*    (2006.01)
(52) U.S. Cl.
    CPC .............. *G01N 33/54389* (2021.08)
(58) Field of Classification Search
    CPC ....... G01N 33/54389; G01N 33/54391; G01N 33/54388; G01N 33/558; G01N 33/58; G01N 33/54387; B01L 2300/0825

USPC ....... 422/400, 401, 420, 421, 425, 426, 430; 435/287.7, 287.9, 970, 805, 810; 436/169, 170, 514, 518, 530, 810
    See application file for complete search history.

(56) References Cited

U.S. PATENT DOCUMENTS

| | | | |
|---|---|---|---|
| 4,857,453 A | * | 8/1989 | Ullman ............ G01N 33/54388 |
| | | | 436/514 |
| 5,939,331 A | | 8/1999 | Burd et al. |
| 6,251,615 B1 | | 6/2001 | Oberhardt et al. |

(Continued)

FOREIGN PATENT DOCUMENTS

| | | |
|---|---|---|
| CN | 1720455 A | 1/2006 |
| CN | 106198150 A | 12/2016 |

(Continued)

OTHER PUBLICATIONS

Lagarde et al., Translation of Description of WO-2007068811-A1, 2007, Espacenet, 11 pages (Year: 2007).*

(Continued)

*Primary Examiner* — Christopher L Chin
*Assistant Examiner* — Ellis Follett Lusi
(74) *Attorney, Agent, or Firm* — KNOBBE, MARTENS, OLSON & BEAR LLP

(57) ABSTRACT

Lateral flow assay devices, systems, and methods described herein separate components of a fluid sample, including small volume, undiluted, unprocessed samples. In one aspect, components are retained in a separation membrane that is spatially above and in fluid communication with a conjugate pad of a lateral flow assay. Devices, systems, and methods described herein can retain particles from a fluid sample that obstruct flow of the fluid sample through the conjugate pad to a detection zone and/or interfere with detection of an analyte of interest in the detection zone.

24 Claims, 13 Drawing Sheets

(56) References Cited

U.S. PATENT DOCUMENTS

| | | | |
|---|---|---|---|
| 6,440,306 | B1 | 8/2002 | Ditter et al. |
| 7,441,666 | B2 | 10/2008 | Kim et al. |
| 7,781,172 | B2 | 8/2010 | Song |
| 8,377,643 | B2 | 2/2013 | Mehra et al. |
| 8,399,261 | B2 | 3/2013 | Kabir et al. |
| 8,440,085 | B2 | 5/2013 | Bormann et al. |
| 8,535,617 | B2 | 9/2013 | MacDonald et al. |
| 2002/0036170 | A1 | 3/2002 | Harvey et al. |
| 2004/0121480 | A1 | 6/2004 | Wei et al. |
| 2006/0019406 | A1 | 1/2006 | Wei et al. |
| 2007/0020768 | A1* | 1/2007 | Rundstrom .......... G01N 33/558 436/514 |
| 2007/0184506 | A1* | 8/2007 | Klepp .............. G01N 33/54366 436/514 |
| 2009/0253119 | A1 | 10/2009 | Zhou et al. |
| 2010/0099112 | A1 | 4/2010 | Zhou et al. |
| 2011/0076697 | A1 | 3/2011 | Ruvinsky et al. |
| 2014/0242613 | A1* | 8/2014 | Takeuchi ............. G01N 33/558 435/7.32 |
| 2016/0169882 | A1* | 6/2016 | Snider ................... A61B 90/98 422/424 |
| 2017/0212108 | A1* | 7/2017 | Li ........................ G01N 33/558 |
| 2017/0212112 | A1* | 7/2017 | Li ..................... G01N 33/54393 |
| 2018/0356393 | A1* | 12/2018 | Piasio ................ G01N 27/3272 |

FOREIGN PATENT DOCUMENTS

| | | | | |
|---|---|---|---|---|
| WO | WO 2003/008933 | A2 | 1/2003 | |
| WO | WO-2007068811 | A1 * | 6/2007 | ............ B01L 3/5023 |
| WO | WO 2017/221255 | | 12/2017 | |
| WO | WO 2019/005694 | | 1/2019 | |
| WO | WO 2019/241342 | A1 | 12/2019 | |

OTHER PUBLICATIONS

International Search Report and Written Opinion dated Nov. 27, 2019 for Application No. PCT/US2019/044684.
International Preliminary Report on Patentability dated Feb. 9, 2021 for Application No. PCT/US2019/044684.
Lichtenberg et al., "Sample pretreatment on microfabricated devices", Talanta, Feb. 2002; 56(2):233-266.
European Extended Search Report dated Apr. 11, 2022 for EP Application No. 19848388.5 in 5 pages.

* cited by examiner

LATERAL FLOW IMMUNOASSAY DEVICE WITH SEPARATION MEMBRANE

CROSS REFERENCE TO RELATED APPLICATION

This application is a continuation of PCT Application No. PCT/US2019/044684, filed Aug. 1, 2019, which claims the benefit of U.S. Provisional Application No. 62/715,129, filed Aug. 6, 2018, which is hereby incorporated by reference in its entirety.

FIELD

The present disclosure relates in general to lateral flow devices, test systems, and methods. More particularly, the present disclosure relates to lateral flow assay devices including a separation membrane that is capable of separating components of a fluid sample, such as removing components that may interfere with detection of an analyte of interest. A fluid sample can thus be applied to the present lateral flow device without first being processed, thereby preempting the need for sample processing and simplifying the analysis of a sample using a point of care device.

BACKGROUND

Immunoassay systems, including lateral flow devices described herein provide reliable, inexpensive, portable, rapid, and simple diagnostic tests. Lateral flow assays can quickly and accurately detect the presence or absence of, and in some cases quantify, an analyte of interest in a sample. Advantageously, lateral flow assays can be minimally invasive and used as point-of-care testing systems.

Lateral flow devices are capable of receiving samples of a particular format. Typical acceptable samples are processed between collection from the sample source and application to the lateral flow device to remove or reduce the presence of confounding components, such as but not limited to components that obstruct the flow of sample through the device, components that interfere with detection of an analyte of interest in the device, and components that otherwise detract from accurate detection an analyte of interest. In some cases, immunoassays include an assay membrane though which a fluid sample passes. The fluid sample carries objects of interest, such as analytes of interest, from a receiving zone to a detection (or "test") zone downstream of the receiving zone.

In some cases, exposing the assay membrane to a raw fluid sample may result in clogging of the assay membrane, such that the fluid sample cannot flow through the assay membrane to the detection zone or movement of the fluid sample through the assay membrane to the detection zone is inhibited. This can result in very little or no analyte of interest flowing to the detection zone, leading to an inaccurate test result indicating that the fluid sample is "negative" for the analyte of interest or the analyte of interest is present at a concentration lower than the actual concentration.

Embodiments of the present technology remove confounding components that interfere with the flow of objects of interest from the receiving zone to the detection zone and/or that interfere with detection of the objects of interest once they have flowed to the detection zone. Confounding components can include but are not limited to particles in the fluid sample. One example particle is a cell in a blood sample, such as but not limited to a red blood cell.

Confounding components described herein may include (but are not limited to) soluble or insoluble components in a raw fluid sample that aggregate or coalesce after application to a lateral flow device, thereby obstructing the flow of objects of interest, such as analytes of interest, in the fluid sample through the assay membrane of the device.

Confounding components described herein may include (but are not limited to) components having optical properties that are substantially the same or similar to optical properties of a labeled conjugate implemented on the lateral flow device to detect an analyte of interest. The presence of such confounding components can interfere with detection of objects of interest, such as labeled analytes of interest, in the fluid sample. For example, immunoassays using optical detection methods such as reflectance attenuated by label particles that absorb light (for example colloidal gold nanoparticles) typically require an assay medium that is transparent in the visible region of the electromagnetic spectrum. Otherwise, undesirable interference can occur during optical detection of the signal generated by the label particles.

Some types of samples, such as whole blood samples, are particularly prone to this type of undesirable interference. Many physiologically relevant substances are found in whole blood, making a whole blood sample a particularly desirable type of sample to apply to an immunoassay that labels analyte of interest with a reflectance-type particle. Red blood cells, specifically the hemoglobin protein within red blood cells, absorb strongly in the same spectral region as colloidal gold, a common label used in reflectance-type assays. Thus, in conventional systems, the measurement of such substances of interest in a whole blood sample requires the sample to be processed to remove red blood cells prior to applying the sample to the immunoassay. Typically, this is accomplished either by centrifugation to produce plasma, or by clotting and separating the resulting serum prior to contacting the lateral flow device with the sample. Neither plasma nor serum absorb significantly in the visible region. Thus, plasma or serum processed from a whole blood sample can be suitable specimens for lateral flow immunoassays.

Preparation of plasma or serum from a whole blood sample, however, is time consuming labor intensive, prone to errors and contamination of the sample, and requires a relatively large volume of whole blood (in the range of milliliters). In addition, the complexity of the processes precludes use in some clinical settings such as doctor's offices and other point of care facilities that do not have direct and immediate access to a laboratory, or lack trained laboratory personnel to operate sample processing equipment.

SUMMARY

It is therefore an aspect of this disclosure to provide improved lateral flow assays capable of processing raw, unprocessed fluid samples by separating confounding components from analyte of interest in the sample, including separating components that obstruct the flow of sample through the device and/or separating components that are capable of interfering with the detection of the analyte of interest. Specifically, it is an aspect of this disclosure to provide lateral flow assays including a separation membrane that separates components of a fluid sample, allowing analyte of interest to flow through the separation membrane to the assay device for detection and/or quantification of the analyte of interest.

A lateral flow assay device for detecting an analyte of interest in a fluid sample is provided. In one example implementation, the assay device includes a first flow path configured to receive the fluid sample. The first flow path extends between a top surface and a bottom surface of a membrane configured to retain particles in the fluid sample. The assay device also includes a second flow path extending from a buffer receiving zone through a sample receiving zone to a capture zone downstream of the sample receiving zone. The sample receiving zone includes a conjugate including a label and an agent configured to specifically bind to the analyte of interest. The capture zone includes an immobilized capture agent specific to the analyte of interest. The second flow path can be spatially below and in fluid communication with the bottom surface of the membrane. The buffer receiving zone is configured to receive a buffer that directs the fluid sample received through the bottom surface of the membrane along the second flow path to the capture zone.

In some cases, the first flow path is generally transverse to the second flow path. The membrane can be configured to retain particles that obstruct the flow of the analyte of interest. The membrane can be configured to retain particles that interfere with detection of the analyte of interest at the capture zone. The membrane can be configured to retain particles based on the size of the particles and/or affinity of the particles to agents in the membrane.

In some aspects, the sample receiving zone is spatially below and in fluid communication with the bottom surface of the membrane. The fluid sample can include an undiluted, whole blood sample; an undiluted venous blood sample; an undiluted capillary blood sample; an undiluted, serum sample; or an undiluted plasma sample. The particles can include red blood cells. The volume of the fluid sample can be between about 50 μL and about 100 μL. The analyte of interest can include C-reactive protein (CRP).

In some implementations, the assay device also includes a cartridge defining a buffer well and a sample well in communication with the buffer receiving zone and the sample receiving zone, respectively. The cartridge can include compression structures configured to compress portions of the membrane. The compression in portions of the membrane generated by the compression structures can prevent the particles from flowing through the bottom surface of the membrane to the second flow path. The compression in portions of the membrane generated by the compression structures can prevent the particles from flowing through edges of the membrane to the second flow path. The compression in portions of the membrane generated by the compression structures can prevent the particles from flowing across the top surface of the membrane and onto the second flow path. The sample well can include compression structures.

In some cases, the second flow path includes a conjugate pad in fluid communication with an assay membrane. The conjugate pad can include the buffer receiving zone and the sample receiving zone. The assay membrane can include the capture zone. The bottom surface of the membrane configured to retain particles can be adhered to the top surface of the conjugate pad with double-sided adhesive.

In some aspects, the membrane retains the particles in the fluid sample before the labeled conjugate in the sample receiving zone solubilizes. In some aspects, the particles in the fluid sample do not enter the second flow path. The membrane can include an asymmetric plasma separation membrane. The fluid sample can include a whole blood sample when the fluid sample flows in the first flow path, and the fluid sample can include a cell-free plasma sample when the fluid sample flows in the second flow path. In some aspects, the buffer received in the buffer receiving zone does not flow through the first flow path. The labeled conjugate can include a label and an antibody or fragment thereof that specifically binds to the analyte of interest. The label can include a gold nanoparticle.

A method of detecting an analyte of interest in a fluid sample is also provided. In one example implementation, the method includes applying the fluid sample to a first flow path extending between a top surface and a bottom surface of a membrane configured to retain particles in the fluid sample. The method also includes retaining particles in the fluid sample in the membrane. The method further includes receiving the fluid sample in a second flow path spatially below and in fluid communication with the bottom surface of the membrane, the second flow path extending from a buffer receiving zone through a sample receiving zone to a capture zone downstream of the sample receiving zone. The sample receiving zone includes a conjugate comprising a label and an agent configured to specifically bind to the analyte of interest. The capture zone includes an immobilized capture agent specific to the analyte of interest. The method also includes adding a buffer to the buffer receiving zone such that the fluid sample received in the second flow path flow to the capture zone.

In some cases, the method also includes labeling the analyte of interest with the labeled conjugate after retaining particles in the fluid sample in the membrane. The method can also include binding the labeled analyte of interest to the immobilized capture agents in the capture zone; and detecting a signal from the labeled analyte of interest bound to the immobilized capture agents in the capture zone. The detected signal can include a reflective signal, a fluorescent signal, or a magnetic signal.

In some aspects, buffer is added to the buffer receiving zone after an incubation period. The first flow path can be generally transverse to the second flow path. Retaining particles in the fluid sample can include retaining particles that obstruct the flow of the analyte of interest. Retaining particles in the fluid sample can include retaining particles that interfere with detection of the analyte of interest at the capture zone. Retaining particles in the fluid sample can include retaining particles based on the size of the particles and/or affinity of the particles to agents in the membrane.

In some implementations, particles retained in the membrane do not flow into the second flow path when the fluid sample is received in the second flow path. In some implementations, particles retained in the membrane do not flow into the second flow path when the buffer is added to the buffer receiving zone. In some implementations, particles in the fluid sample do not enter the second flow path. In some implementations, particles in the fluid sample are retained in the membrane before the labeled conjugate in the sample receiving zone solubilizes.

The membrane can include an asymmetric plasma separation membrane. The fluid sample can include a whole blood sample when the fluid sample flows in the first flow path and the fluid sample can include a cell-free plasma sample when the fluid sample flows in the second flow path. In some cases, buffer received in the buffer receiving zone does not flow through the first flow path. The fluid sample can include an undiluted, whole blood sample; an undiluted venous blood sample; an undiluted capillary blood sample; an undiluted, serum sample; or an undiluted plasma sample. The particles can include red blood cells. The volume of the fluid sample can be between about 50 μL and about 100 μL.

BRIEF DESCRIPTION OF THE DRAWINGS

FIG. 9A is a black-and-white version of a color photograph. The color photograph and the black-and-white version of the color photograph (shown in FIG. 9A) depict the similarities in optical properties of particulate matter retained in a separation membrane according to the present disclosure and an optical signal generated at a capture zone of the example lateral flow device. FIG. 9B depicts a dose response curve corresponding to the optical signals detected from the devices shown in FIG. 9A.

DETAILED DESCRIPTION

Figure 1:
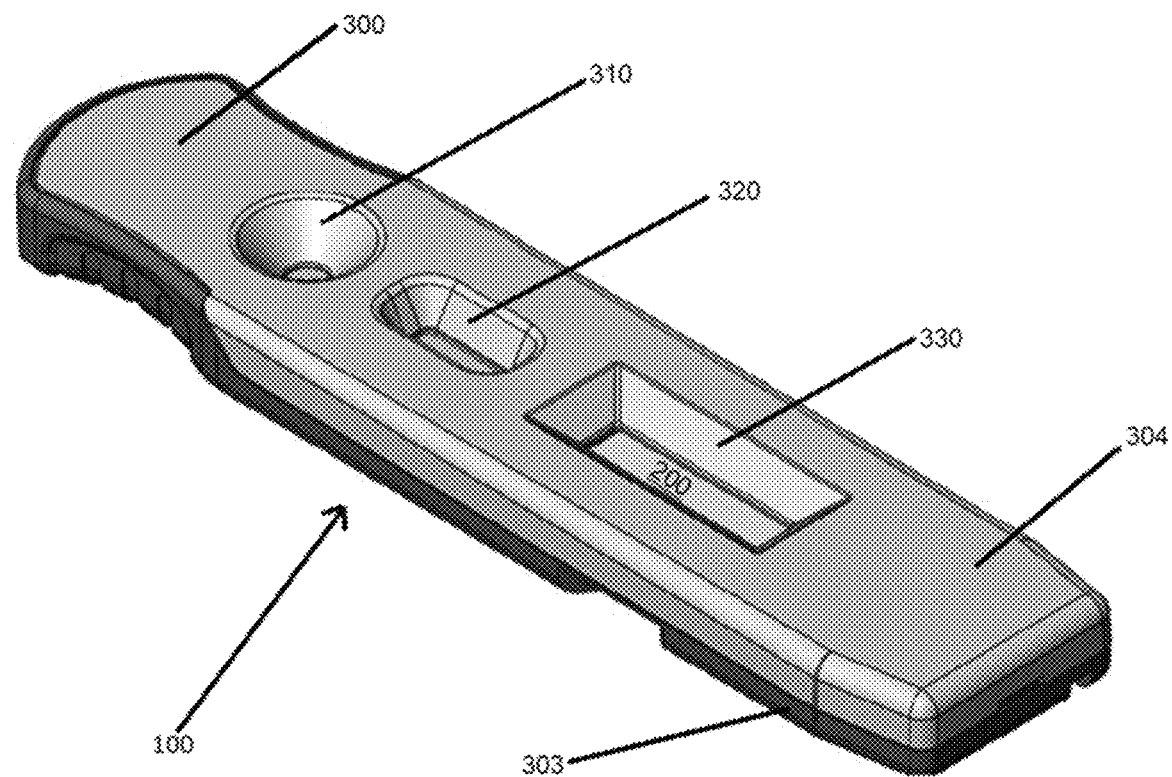
FIG. 1 illustrates an example lateral flow device according to the present disclosure.

Lateral flow assays described herein include an assay test strip for detecting one or more analytes of interest present in the fluid sample. Devices, systems, and methods described herein enhance detection of the analyte of interest in a fluid sample by retaining confounding components in a membrane through which the fluid sample passes. Lateral flow devices, test systems, and methods according to the present disclosure improve detection of analytes of interest in a sample, including precisely determining a quantity or concentration of analyte in the sample, in situations where the sample is a complex sample having multiple components, including undesirable components that obstruct the flow of analytes of interest through the lateral flow device and/or components that interfere with detection of the analyte of interest due to similarities in optical characteristics of the confounding components and other components of the device (such as but not limited to labeled conjugate).

Advantageously, lateral flow devices, test systems, and methods described herein determine the presence, absence, or quantity of analytes of interest present in a sample without the need to first process or prepare the sample to remove confounding components present in the sample. In some advantageous examples described below, a lateral flow device according to the present disclosure can detect an analyte of interest in an unprocessed sample with the same or a higher degree of accuracy than would be obtained by processing the same sample to remove confounding components and applying such processed sample to a conventional device. The improved detection capability resulting from removal or retention of confounding components in a fluid sample in a separation membrane according to the present disclosure can allow smaller volumes of fluid sample (with correspondingly smaller quantities or concentration of analyte of interest) to be applied to the lateral flow device of the present disclosure. Thus, embodiments of the present disclosure reduce or completely obviate a need to process a raw sample of relatively high volume prior to contacting the sample on a lateral flow assay, resulting in lateral flow devices, test systems, and methods that accurately detect the presence, absence, and in some cases quantity of analyte of interest in a relatively small volume of raw, unprocessed sample.

For example, aspects of the lateral flow assays described herein include contacting the lateral flow assay with a volume of raw, unprocessed sample of between 50 µL and 100 µL. In non-limiting embodiments of the present disclosure, the raw, unprocessed sample is a whole blood sample. It will be understood that embodiments of the present disclosure are not limited to whole blood sample, and are applicable to any raw, unprocessed sample, as well as any processed sample, that includes confounding components that interfere with or diminish the ability to detect analyte of interest in the sample.

Advantageously, lateral flow assays according to the present disclosure can measure the presence and concentration of multiple analytes of interest that are present at significantly different concentrations in a single, undiluted, unprocessed sample that is applied, in a single test event, to a single lateral flow assay. In conventional systems, a sample suspected of including an analyte of interest at high or very high concentrations is first diluted, and then a portion of the diluted sample is applied to a lateral flow assay configured to detect the analyte of interest in the now-lowered range of concentrations of the diluted sample. The ability of embodiments of the present disclosure to measure the presence and concentration of multiple analytes of interest present in a sample at different concentrations (including concentrations differing by six orders of magnitude, or concentrations on the order of one million times different) without ever diluting the sample offers significant advantages.

For example, embodiments of the lateral flow assays described herein can measure analytes of interest present in raw, unprocessed samples, such as whole blood samples. Advantageously, the whole blood sample can include venous blood or capillary blood. Embodiments of the present disclosure can also measure multiple analytes of interest present in processed samples, such as serum or plasma samples, that have not been diluted prior to application to the lateral flow assay. For example, the single sample may be an undiluted, whole blood sample; an undiluted venous blood sample; an undiluted capillary blood sample; an undiluted, serum sample; or an undiluted plasma sample. Accordingly, undesirable components of a sample may be separated out of the sample by a separation membrane of the present disclosure, thereby allowing detecting of one or more analytes of interest in a small quantity of sample, without the need to first process a larger quantity of sample into a specimen suitable to contact the lateral flow assay. Further, embodiments of the present disclosure include a multi-format assay test strip that is configured to accept any of the following sample formats without modifying the assay test strip: a whole blood sample, a pre-separated plasma sample, and a serum sample.

Separation membranes according to the present disclosure can separate components of a sample based on size and/or affinity of components to the membrane, while allowing objects of interest to pass through the membrane and flow in the fluid path to a detection zone of the assay. In one example, a separation membrane of the present disclosure allows passage of smaller components of a sample but does not allow passage of larger components (such as confounding components) of a sample. The characteristics of the separation membrane can be optimized to prevent passage of the larger confounding components typically expected to be present in a fluid sample. In another example, a separation membrane of the present disclosure includes affinity agents that bind (specifically or non-specifically) to components (such as confounding components) of a sample, but does not bind to objects of interest (such as analytes of interest) in the sample. In a further example, a separation membrane of the present disclosure retains undesirable components in a sample based on both size and affinity characteristics of the components.

Depending on the type of specimen and the source from which the specimen is taken, a specimen may be processed, treated, or prepared to obtain a sample in a format that is suitable to be applied to a lateral flow device. The source of the specimen can be a biological source, an environmental source, or any other source suspected of including an analyte of interest. Embodiments of the present disclosure can detect analytes of interest in a specimen that has not been processed prior to contacting the lateral flow device with the specimen. In one non-limiting example, a specimen that has not been processed, treated, or prepared is applied to a lateral flow device according to the present disclosure. In this example, the raw specimen obtained from the original source is not processed into a sample before applying the raw specimen to the lateral flow device of the present disclosure. Although reference is made throughout the present disclosure to a "sample" being applied to a lateral flow device, it will be understood that such sample can include a raw specimen that has not been processed or prepared into a conventional sample format.

In one non-limiting example, the sample is a raw sample that includes all components as directly obtained from a source, including but not limited to a biological subject. In one embodiment, the raw sample is any unmodified collected blood sample, referred to herein as a whole blood sample. In this non-limiting example, a separation membrane according to the present disclosure includes a plasma separation membrane, capable of separating components of the whole blood sample based on the size of the component. The whole blood sample contacts the plasma separation membrane. Confounding components in the whole blood sample, such as red blood cells, are retained on or captured in the plasma separation membrane, because the red blood cells are too large to pass through the plasma separation membrane. Plasma, which may include analyte of interest, passes through the plasma separation membrane, and flows onto the assay test strip of the present disclosure.

The analyte of interest, if present, contacts labeled conjugate, which includes a label and an antibody or fragment thereof that specifically binds the analyte of interest. The labeled conjugate, now bound to analyte of interest, flows through the assay test strip to a detection zone, wherein immobilized capture agent binds analyte of interest. If present, analyte of interest, bound to labeled conjugate, is captured by the immobilized capture agent in the detection zone to form a "sandwich" structure. The sandwich structure may generate a signal above a detection threshold of a measurement system, indicating the presence and in some cases the quantity of analyte of interest present in the sample. If the analyte of interest is not present in the sample, sandwich structures do not form and a signal is not generated in the detection zone, indicating absence of the analyte of interest.

Components in a sample can interfere with detection of signals generated at the detection zone. Embodiments of the present disclosure can reduce "false negative" readings, such as when a signal is generated at the detection zone in the presence of the analyte of interest in the sample, but the signal is not detected due to interference from confounding components, causing the generated signal to fall below a detection threshold of the measurement system. Accordingly, embodiments of the present disclosure address drawbacks associated with prior systems, where absence of a detectable signal at the detection zone may not necessarily indicate absence of the analyte of interest in the sample.

Embodiments of the present disclosure can include a separation membrane specifically selected and designed to retain components that interfere with detection of a particular analyte of interest present at a concentration near the detection threshold of a conventional measurement system (where signals may fall at or below the detection threshold and yield a false negative test result). Thus, embodiments of the present disclosure can increase accuracy of a lateral flow device by improving detection of signals at the detection zone that would ordinarily fall below the detection threshold of a conventional measurement system.

Embodiments of the present disclosure can include a separation membrane specifically selected and designed to retain components that interfere with detection of a particular labeled conjugate. One example type of interference occurs when a confounding component has an optical characteristic that is substantially the same or similar to an optical characteristic of the labeled conjugate in the sandwich structure formed in the detection zone. In one embodiment, the labeled conjugate includes a gold nanoparticle, which generates a signal with optical properties similar to optical properties of red blood cells in a blood sample. For example, the gold nanoparticle may generate a signal at the same or similar wavelength of light as a red blood cell. Embodiments of the present disclosure reduce or eliminate interference from confounding components, such as but not limited to red blood cells in a sample, by retaining or capturing the confounding components at a separation membrane, such that the optical characteristics of the red blood cells do not interfere with detection of signals generated at the detection zone.

The description above is intended to illustrate an example circumstance wherein a fluid sample may be a raw, unprocessed sample and may include multiple components, at least some of which are capable of hindering the detection of one or more analytes of interest in the sample, by preventing or hindering the flow of the analyte of interest through the assay strip, by interfering with the optical characteristics of a label bound to the analyte of interest, or by otherwise confounding detection of analyte of interest in the sample. One of skill in the art will recognize, however, that the examples are intended to be exemplary, and that various modifications and variations of the lateral flow assays described herein can enhance detection of analytes of interest in processed, treated, or prepared samples. For example, embodiments of the present disclosure can advantageously enhance detection in a fluid sample other than a blood sample, and in samples that include confounding components in addition to or different than red blood cells. Furthermore, a fluid sample may include more than one analyte of interest (such as but not limited to two, three, four, five, six, seven, eight, nine, or ten) analytes of interest, any one or more of which is capable of passing through the separation membrane and flowing to a detection zone of an assay device of the present disclosure. Embodiments of the lateral flow devices described herein are particularly advantageous in diagnostic tests for a small quantity of an unprocessed fluid sample, where detection of an analyte of interest may be indicative of a disease state.

Although embodiments of the present disclosure are described herein with reference to enhancing detection of analytes of interest occurring in high or very high concentration without diluting the sample, in samples of relatively small volume, and in samples that have not been modified or processed after collection from an original source, it will be understood that the present disclosure is not limited to these particular embodiments or advantages. Embodiments of the present disclosure can enhance detection of analytes of interest that are not present at high or very high concentration, in samples of relatively high volume, and in samples that are diluted, processed, treated, or prepared.

Signals generated by assays according to the present disclosure are described herein in the context of an optical signal generated by reflectance-type labels (such as but not limited to gold nanoparticle labels and different-colored latex particles). Although embodiments of the present disclosure are described herein by reference to an "optical" signal, it will be understood that assays described herein can use any appropriate material for a label in order to generate a signal, including but not limited to fluorescence-type latex bead labels that generate fluorescence signals and magnetic nanoparticle labels that generate signals indicating a change in magnetic fields associated with the assay.

Conventional Lateral Flow Devices

Lateral flow devices described herein are analytical devices used in lateral flow chromatography. Lateral flow assays are assays that can be performed on lateral flow devices described herein. Lateral flow devices may be implemented on an assay test strip but other forms may be suitable, for example a dipstick, flow through device, or a microfluidic device. In the test strip format, a fluid sample, containing or suspected of containing an analyte, is placed on a sample receiving zone. Analyte of interest becomes labeled after it contacts the test strip. The now-labeled analyte of interest then flows (for example by capillary action) through the strip. The strip may be made of a medium such as paper, nitrocellulose, cellulose, fibers, or nylon or other material that allows flow of the sample through the medium. In some cases, the medium is transparent in the visible region of the electromagnetic spectrum to reduce undesirable interference.

Such assays are referred to as sandwich assays. Sandwich assays according to the present disclosure are described in the context of reflective-type labels (such as gold nanoparticle labels and different-colored latex particles) generating an optical signal, but it will be understood that assays according to the present disclosure may include latex bead labels configured to generate fluorescence signals, magnetic nanoparticle labels configured to generate magnetic signals, or any other label configured to generate a detectable signal. Sandwich-type lateral flow assays include a labeled conjugate deposited at a sample receiving zone on a solid substrate. After sample is applied to the sample receiving zone, the labeled conjugate dissolves or solubilizes in the sample, whereupon the labeled conjugate recognizes and specifically binds a first epitope on the analyte in the sample, forming a label-conjugate-analyte complex. This complex flows along the liquid front from the sample receiving zone through the solid substrate to a detection zone (sometimes referred to as a "test line" or "capture zone"), where immobilized capture agent (for example immobilized analyte-specific antibody) is located. In some cases where the analyte is a multimer or contains multiple identical epitopes on the same monomer, the labeled conjugate deposited at the sample receiving zone can be the same as the capture agent immobilized in the detection zone. The immobilized capture agent recognizes and specifically binds an epitope on the analyte, thereby capturing label-conjugate-analyte complex at the detection zone. The presence of labeled conjugate at the detection zone provides a detectable signal at the detection zone, if analyte is present in sufficient quantities. In one non-limiting example, gold nanoparticles are used to label the conjugate because they are relatively inexpensive, stable, and provide easily observable color indications due to the surface plasmon resonance properties of gold nanoparticles.

Detection of a signal generated at the detection zone can indicate that the analyte of interest is present in the sample. For example, if the signal exceeds a detection threshold of a measurement system, the measurement system can detect the presence and in some cases quantity of the analyte in the sample. However, absence of any detectable signal at the detection zone can indicate that the analyte of interest is not present in the sample or that it may be present below the detection limit. For example, if the sample did not contain any analyte of interest, the sample would still solubilize the labeled conjugate and the labeled conjugate would still flow to the detection zone. The labeled conjugate would not bind to the immobilized conjugate at the detection zone, however. It would instead flow through the detection zone, through a control zone (if present), and, in some cases, to an optional absorbing zone. Some labeled conjugate would bind to the control agent deposited on the control zone and generate a detectable signal at the control zone, indicating that the device works properly. In circumstances where analyte is present but in an amount below the detection limit, label-conjugate-analyte complex binds at the detection zone, but is not detected. In these circumstances, the absence of a detectable signal emanating from the detection zone means that the user cannot definitively confirm whether analyte is absent from the sample or present in the sample below the detection limit of the measurement system.

Some lateral flow devices can provide quantitative information, such as a measurement of the quantity of analyte of interest in the sample. As the concentration of the analyte increases, an increasing amount of analyte binds to the labeled conjugate, forming an increasing amount of label-conjugate-analyte complex. Immobilized capture agent at the detection zone binds the increasing number of complexes flowing to the detection zone, resulting in an increase in the signal detected at the detection zone. The quantitative measurement obtained from the lateral flow device may be a concentration of the analyte that is present in a given volume of sample, obtained using a dose response curve that correlates the intensity of a signal detected at the detection zone with the concentration of analyte in the sample.

In conventional lateral flow systems, confounding components present in a sample can reduce the quantity of analyte of interest (or adversely impact features of the analyte of interest) that binds to labeled conjugate, flows to the detection zone, and binds to the immobilized capture agent in the detection zone. In conventional lateral flow systems, confounding components present in a sample that have traveled to the detection zone can inhibit detection of label-conjugate-analyte complex bound in the detection zone.

Example Lateral Flow Devices Including a Separation Membrane According to the Present Disclosure Lateral flow assays, test systems, and methods described herein address these and other drawbacks of lateral flow assays by capturing or retaining confounding components in a separation membrane, thereby removing or reducing the confounding components from a fluid sample passing through the membrane. In addition to improving qualitative measurement of analytes, embodiments of the assays, test systems, and methods of the present disclosure can also greatly increase the sensitivity of measurements by a conventional reader, in some cases allowing quantitative measurement of analytes.

Figure 2:
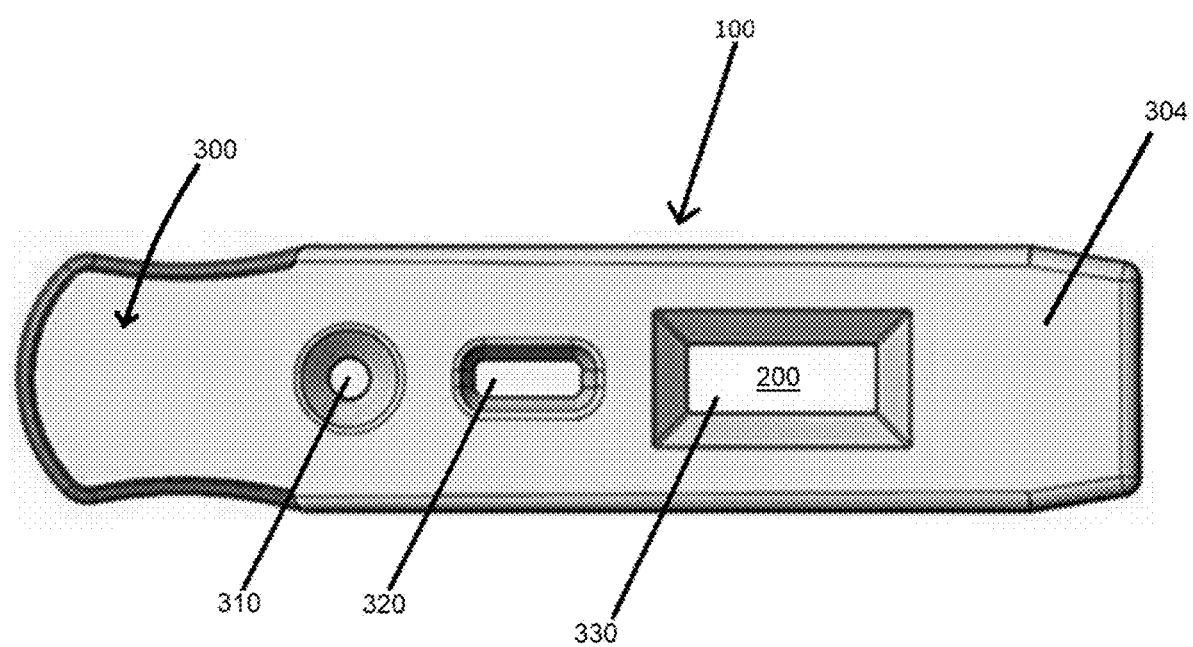
FIG. 2 illustrates a top view of the example lateral flow device of FIG. 1.

Embodiments of lateral flow devices including a separation membrane according to the present disclosure will now be described with reference to FIGS. 1 through 4B. An example lateral flow device 100 is illustrated in FIGS. 1 and 2. The device 100 includes a lateral flow test strip 200 received or housed within a cartridge 300. The cartridge 300 can include a top housing 304 coupled to a base housing 303. The housings 303, 304 can be formed of injection molded plastic, or any other suitable material. A buffer well 310, a sample well 320, and a read window 330 are defined in the top housing 304. A portion of test strip 200 is visible through the read window 330.

It will be understood that embodiments of the present disclosure are not limited to this example configuration. For example, lateral flow assay test strips of the present disclosure can be housed in a cartridge that does not define wells and read windows. It will also be understood that devices 100 according to the present disclosure may not include a cartridge 300, and only include a lateral flow test strip 200.

The lateral flow device 100 may be of a size and shape for ease of use, rapid delivery of test results, portability, proper functioning and placement within an automated reader, economy in material use and cost, or other considerations. The size and shape is therefore not limited to any particular size or shape, and may be readily modified to fit the specific needs or requirements of the specific circumstances of use.

Figure 3A:
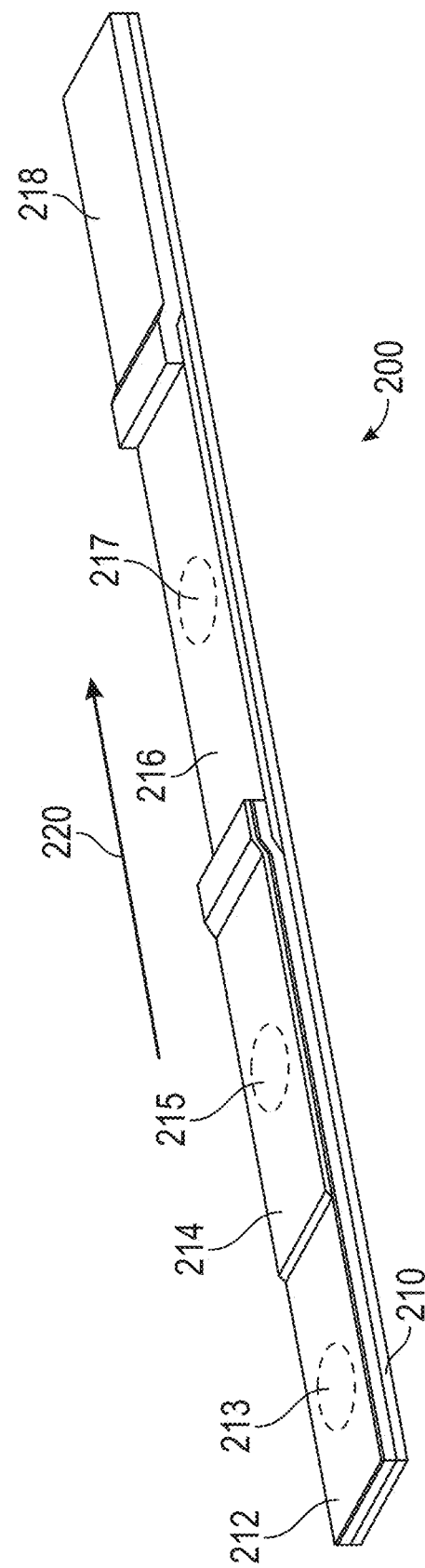
FIG. 3A illustrates an example lateral flow assay strip according to the present disclosure.
Figure 3B:
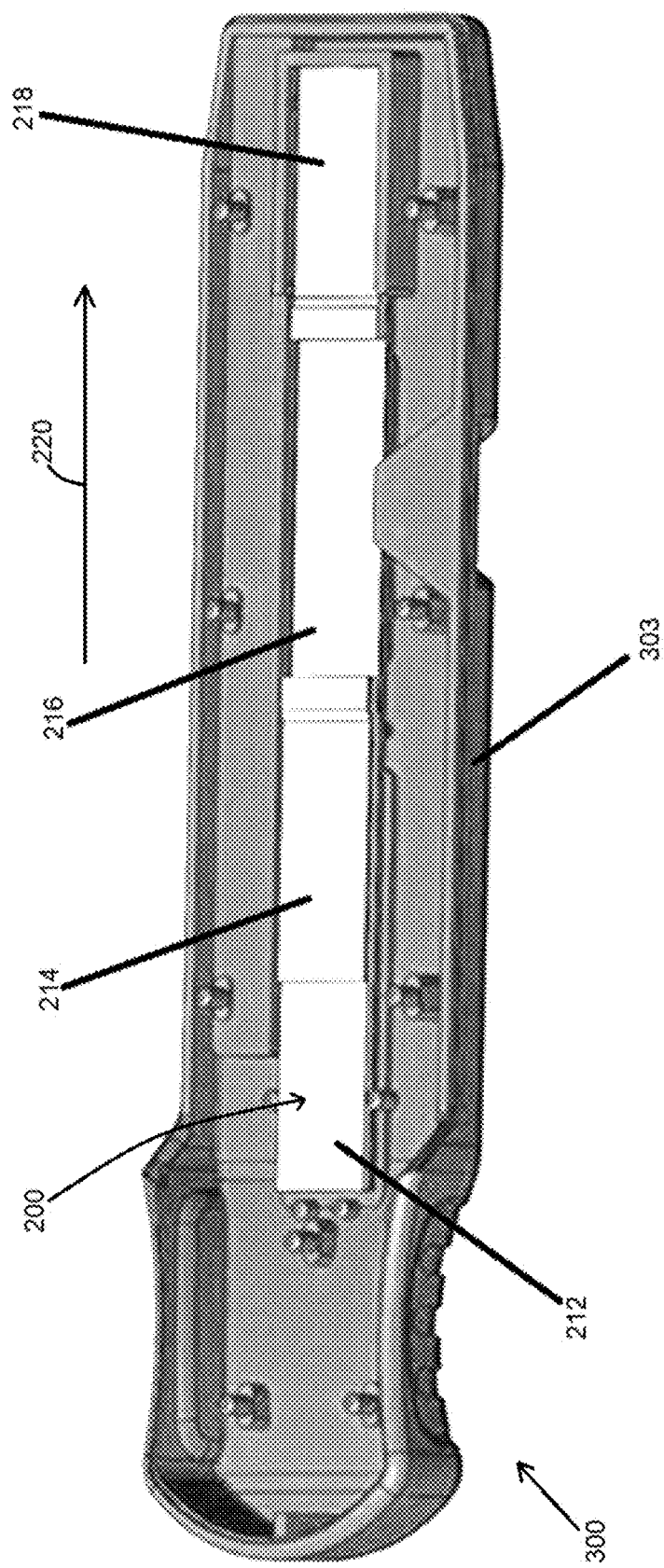
FIG. 3B illustrates the example lateral flow assay strip of FIG. 3A received in a base housing of the example lateral flow device of FIG. 1.

FIGS. 3A and 3B illustrate an example assay test strip 200 according to the present disclosure. The assay test strip 200 of the present disclosure may be received or housed within the lateral flow device 100 of FIG. 1. The example assay test strip 200 in this non-limiting embodiment includes a substrate, an assay membrane having a sample receiving zone and a buffer receiving zone, a detection zone, and an absorbent pad. It will be understood that the present disclosure is not limited to this example assay test strip, and other assay test strips with different features can be implemented in accordance with the present disclosure.

In the embodiment of FIGS. 3A and 3B, the assay test strip 200 includes a backing card 210, a conjugate pad 212 including a buffer receiving zone 213, a separation membrane 214 including a sample receiving zone 215, an assay membrane 216 including a detection zone 217, and an absorbent pad 218. Fluid is configured to flow along a longitudinal axis 220 of the assay test strip 200 from the conjugate pad 212 to the absorbent pad 218. Components of the device 100 and the assay test strip 200 can be described with reference to this direction of fluid flow. For example, the conjugate pad 212 is upstream of the absorbent pad 218 and the absorbent pad 218 is downstream of the separation membrane 214. For another example, the sample well 320 is downstream of the buffer well 310 and upstream of the read window 330. As shown in FIG. 3B, the assay test strip may be sized and shaped to be received within the base housing 303.

The backing card 210 is a support structure that runs along the longitudinal axis of the assay test strip, providing support for the assay test strip. The backing card is size and shaped to be aligned relative to and interact with compression points and structures in base housing 303 described below with reference to FIGS. 4A, 4B, and 5. The backing card 210 may be any suitable material sufficient to support an assay test strip, for example, a water impervious layer, such as solid plastics, laminated sheets, composite materials, or the like. The absorbent pad 218 assists in promoting capillary action and fluid flow through the assay membrane 216, and may include any material known in the art for absorbing fluid, including, for example, nitrocellulose, cellulosic materials, porous polyethylene pads, glass fiber filter paper, and so forth.

The detection zone 217 of the assay membrane 216 is downstream of the conjugate pad 212 and is located at least partially below the read window 130 when the assay test strip 200 is housed within the cartridge 300. The detection zone 217 includes immobilized capture agent configured to specifically bind an analyte of interest when present in the sample. The assay membrane 216 may also include additional detection zones for detecting more than one analyte of interest, and may include one or more control zones. The assay membrane 216 can include a nitrocellulose membrane or any other suitable membrane. The assay membrane 216 can provide a medium that is transparent in the visible region of the electromagnetic spectrum to minimize or prevent undesirable interference from material properties of the assay membrane 216 during detection of signals generated at the detection zone.

The assay test strip of lateral flow assays described herein can include a plurality of capture zones. Where more than a single analyte of interest is to be detected, for example, multiple analytes of interest in the fluid, the detection zone 217 may include a separate capture zone specific for each analyte of interest. For example, a sample may include three analytes of interest: a first analyte of interest, a second analyte of interest, and a third analyte of interest. The detection zone 217 of the lateral flow assay would thus include three capture zones: a first capture zone specific to the first analyte of interest, a second capture zone specific to the second analyte of interest, and a third capture zone specific to the third analyte of interest.

Capture agent may be immobilized on or within the assay membrane 216 using any suitable method including, for example, depositing, spraying, soaking, immersing, pouring, or injecting capture agent on or within the assay membrane 216. For example, capture agent may be deposited and immobilized on the assay membrane 216 by preparing a solution including capture agent and spraying the solution onto the assay membrane 216 with air jet techniques. In another example, the capture agent is deposited by preparing a solution having capture agent and pouring the solution, spraying the solution, formulating the solution as a powder or gel that is placed or rubbed on the test strip, or any other suitable method. The capture agent can be immobilized in any suitable amount in the detection zone 217 of the assay test strip 200. In some embodiments, the immobilized capture agent is present in an amount ranging from about 0.1-20 µL/test strip.

The conjugate pad 212 is placed over an upstream portion of the backing card 210 in this example implementation. When the assay test strip 200 is housed within the cartridge 300, a portion of the conjugate pad 212 is accessible through, and in this case located directly below, the buffer well 310. Thus, a fluid buffer added to the device 100 through the buffer well 310 contacts the conjugate pad 212. When the assay test strip 200 is housed within the cartridge 300, the conjugate pad 212 is accessible through the sample well 320.

In embodiments of the present disclosure, the separation membrane 214 is positioned between the sample well 320 and the conjugate pad 212. Thus, a fluid sample added to the device 100 through the sample well 320 contacts the separation membrane 214 (where confounding components of the fluid sample are retained), flows in a generally vertical direction through the separation membrane (a direction generally transverse to the top and bottom surfaces of the separation membrane), and then contacts the conjugate pad 212. In some cases, the conjugate pad 212 is fastened to the backing card 210. The conjugate pad 212 can be fastened to the backing card 210 with an adhesive or any other suitable means for fastening. The conjugate pad 212 may be any suitable material for allowing flow of a fluid through the material, such as fibers (including glass fibers), polyester, or other material that provides uniform flow of fluid through the conjugate pad 212.

The conjugate pad 212 includes a labeled conjugate that configured to solubilize when a fluid passes through the conjugate pad 212. The labeled conjugate is configured to specifically bind to an analyte of interest (if present) in the fluid. Labeled conjugate can be placed on the conjugate pad 212 in a labeling zone. The labeling zone can be located on the conjugate pad directly below the sample well 320 or downstream of the sample well 320, or any other suitable position such that labeled conjugate in the labeling zone solubilizes upon contact with the fluid sample, and specifically binds an analyte of interest, if present, in the fluid sample. Labeled conjugate may be placed on or within the labeling zone of the conjugate pad 212 using any suitable methods, including, for example, depositing, spraying, soaking, immersing, pouring, or injecting labeled conjugate on or within the conjugate pad 212. For example, labeled conjugate may be deposited by preparing a solution having labeled conjugate and spraying the solution with air jet techniques. In another example, the labeled conjugate may be prepared in a solution and deposited by pouring the solution, spraying the solution, formulating the solution as a powder or gel that is placed or rubbed on the test strip, or any other suitable method. In some embodiments, the labeled conjugate is deposited in an amount ranging from about 0.1-20 µL/test strip.

The separation membrane 214 is placed over at least a portion of the conjugate pad 212. When the device 100 is assembled, the separation membrane 214 is located directly below the sample well 320, such that a fluid sample added to the sample well 120 contacts the separation membrane 214 before contacting any other feature of the device 100. In some non-limiting examples, the separation membrane 214 is fastened to the conjugate pad 212 using any suitable means, including but not limited to an adhesive. In one embodiment described below with reference to FIGS. 5 and 6, the separation membrane is fastened to the conjugate pad 212 using a double-sided adhesive tape 222. As will be described in detail below, the double-sided adhesive tape 222 can act as a barrier to prevent flow of confounding components out of the separation membrane 214 and into the conjugate pad 212.

The separation membrane 214 can include any suitable separation membrane sufficient to retain and capture confounding components in a fluid sample passing through the separation membrane 214. For example, the separation membrane 214 may include a size-exclusion membrane, an affinity membrane, or any other suitable type of membrane. For example, an affinity membrane may include agents that specifically bind one or more confounding components of a fluid sample, such as, for example, concanavalin for binding of red blood cells.

Advantageously, embodiments of the present disclosure can provide complete separation of red blood cells within the cartridge 300. Prior technologies that attempt to separate red blood cells from a whole blood sample are ineffective to completely separate and then also completely constrain the red blood cells. In particular, prior technologies suffer from differing levels of leakage of red blood cells within a cartridge, depending on the specific mechanism used to capture, or retard, red blood cells within the system.

Prior technologies using lateral flow or flow-through filtration in various forms suffer from additional drawbacks. For lateral flow, blood filtration relies on delay of red cell blood flow via physical filtration (size exclusion). Plasma separates at the fluid front. If a large blood volume or a chase buffer is employed, red blood cells are eventually washed into the assay membrane, where they can cause interference. Further, in prior technologies that attempt to use a flow-through format using an asymmetric membrane, buffer chasing through the membrane is impractical because upon plasma separation, the trapped red blood cells block further fluid flow through the membrane. In addition, flow-through formats that use conventional filter agents (glass fiber, etc.) with or without additional red cell binding agents (for example, concanavalin) are less efficient retaining red blood cells than embodiments of the asymmetric separation membrane of the present disclosure. In addition, other types of filtration media can result is varying degrees of hemolysis, which introduces hemoglobin into the separated plasma.

As will be described in detail below, embodiments of the present disclosure address these and other drawbacks using one or more of an asymmetric membrane that separates confounding components in a layer whose bottom surface is spatially above and in fluid communication with the fluid flow path formed between the conjugate pad and the assay membrane; optimized positioning of compression points; and a unique adhesive barrier to effectively separate and completely seal the separated red blood cells within the separation membrane. Advantageously, embodiments of the present disclosure do not cause hemolysis of a whole blood sample, and red blood cells separation is quantitative.

Figure 4A:
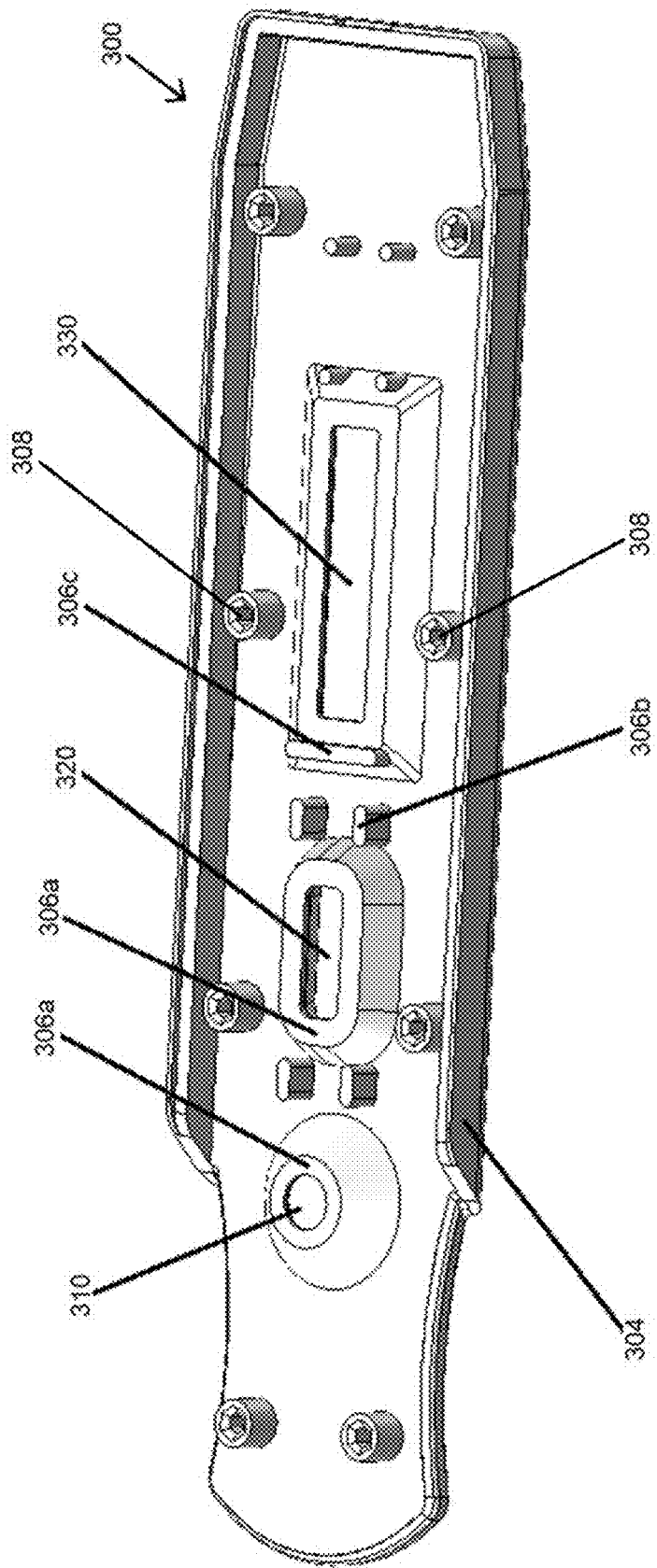
FIG. 4A illustrates an interior view of a top housing of the example lateral flow device of FIG. 1.
Figure 4B:
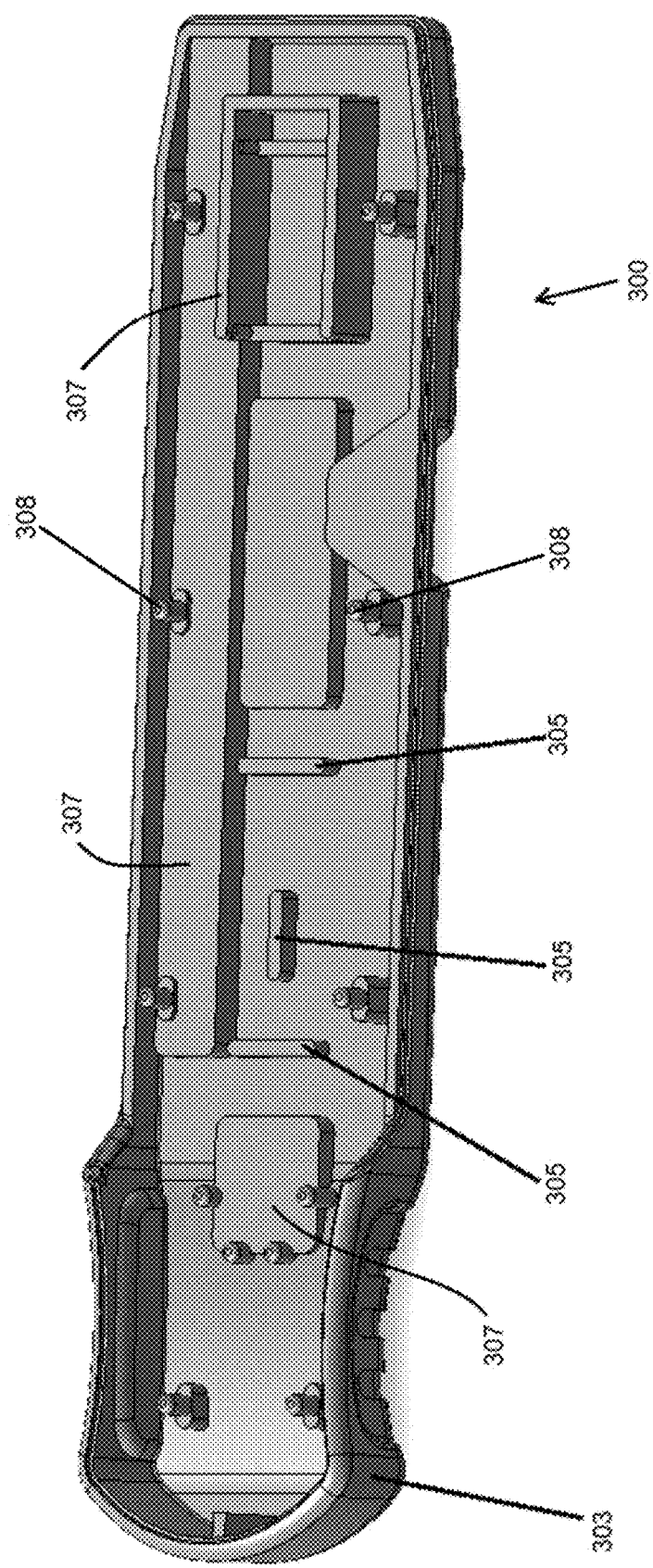
FIG. 4B illustrates an interior view of a bottom housing of the example lateral flow device of FIG. 1.
Figure 4C:
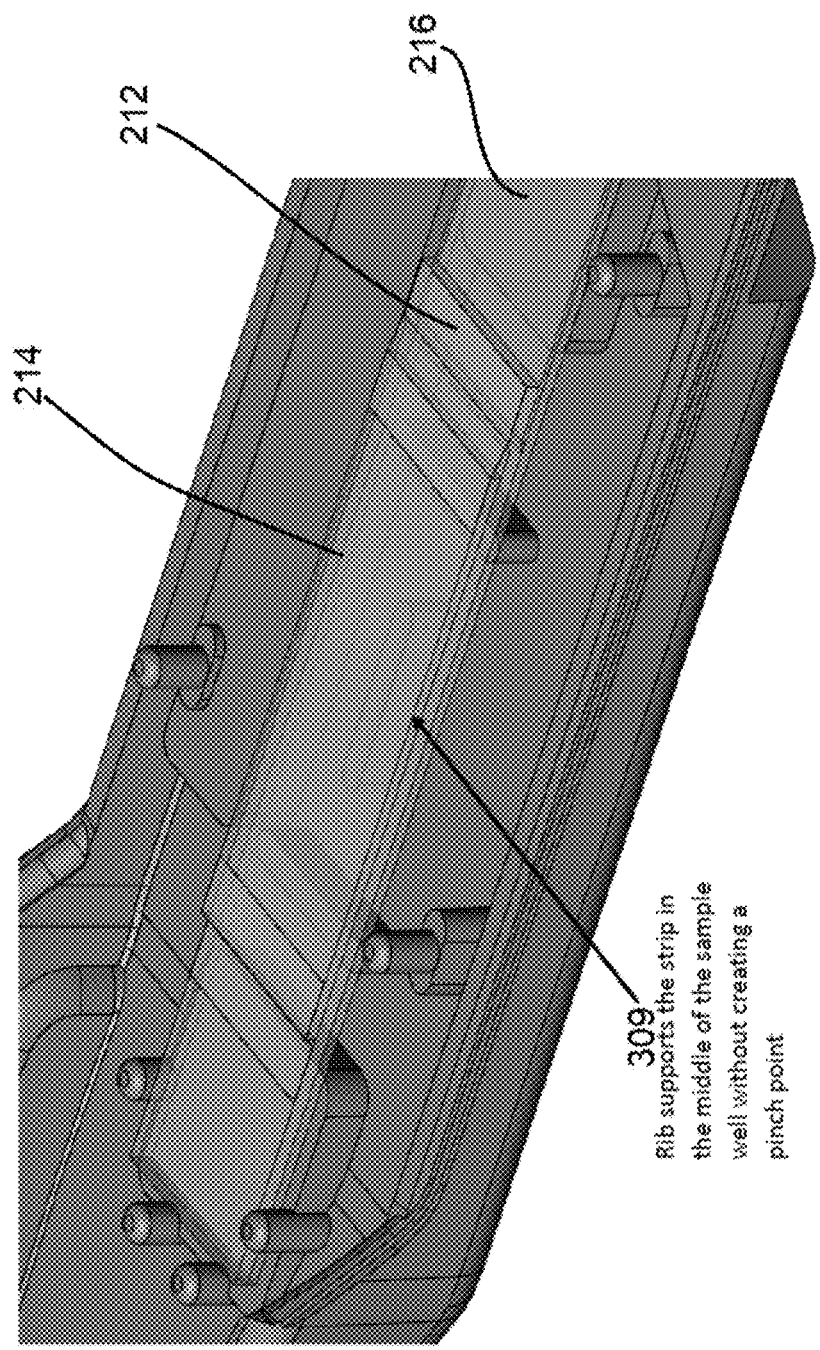
FIG. 4C is a partial view of the base housing of FIG. 4B with an example lateral flow assay strip according to the present disclosure received in the base housing.

Non-limiting features of the cartridge 300 will now be described with reference to FIGS. 4A, 4B, 4C. FIGS. 4A and 4B illustrate interior perspective views of the top housing 304 (FIG. 4A) and the base housing 303 (FIG. 4B) with the assay test strip 200 removed to better illustrate interior features of the cartridge 300. The top housing 304 includes a buffer well 310 configured to receive a buffer solution, a sample well 320 configured to receive a sample, and a read window 330 for reading results of the assay in the detection zone 217. The buffer well 310 includes an opening such that a fluid, for example a buffer solution, added to the buffer well 310 contacts the buffer receiving zone 213 of the assay test strip 200 received within the lateral flow device 100. When the device 100 is assembled with the assay test strip 200 received within the cartridge 300, the buffer well 310 is positioned vertically above at least a portion of the conjugate pad 212.

The sample well 320 includes an opening such that a fluid, for example a fluid sample, added to the sample well 320 contacts the sample receiving zone 215 of the assay test strip 200 received within the lateral flow device 100. When the device 100 is assembled with the assay test strip 200 received within the cartridge 300, the sample well 320 is positioned vertically above at least a portion of the separation membrane 214. The read window 330 includes an opening that is positioned vertically above at least a portion of the detection zone 217 of the assay membrane 216. Results of the assay may be measured at the read window 330 by measuring signals, if any, generated at the detection zone 217.

The top housing 304 includes compression points or structures 306 positioned in various points along an interior side of the top housing 304. In the non-limiting embodiment illustrated in FIG. 4A, the compression points 306 include the lowermost surfaces of the buffer well 310 and the sample well 320 when the device 100 is assembled and positioned to receive a sample. The compression points 306 can also include the lowermost surfaces 306a of the read window 330. The compression points 306 can include compression posts 306b arranged around the sample well 320. The compression points 306 can include a compression bar 306c positioned at an upstream end of the read window 330. The compression points 306 are arranged to contact and compress the assay test strip and/or the separation membrane in select locations. It will be understood that embodiments of the present disclosure are not limited to the particular shape, number, location, or arrangement of compression points 306, compression surfaces 306a, compression posts 306b, and compression bar 306c described with reference to this example and other configurations are suitable.

Compression of select locations of the assay test strip and the separation membrane can assist in maintaining the position of the assay test strip within the cartridge 300 and in retaining confounding components within the separation membrane 214. Compression provided by the compression points 306 can ensure that confounding components captured in the separation membrane 214 are substantially retained in the separation membrane 214 and do not leak or bleed out of edges 221 of the separation membrane 214 (see edges 221 illustrated in FIG. 6). Compression provided by the compression points 306 can also ensure that the fluid sample flows substantially out of a bottom surface of the separation membrane 214 (the portion of separation membrane 214 that contacts the conjugate pad 212, illustrated as bottom surface 220 in FIG. 5) and does not leak out of edges 221 of the separation membrane 214.

The base housing 303 includes mounting features 307 to position and retain features of the assay test strip 200 in alignment with features of the top housing 304. The base housing 303 includes base supports 305 that interact with the compression points 306 to contact and compress the assay test strip and/or the separation membrane in select locations. In one non-limiting example illustrated in FIG. 4C, the base housing 303 include a rib 309 that supports the assay test strip 200 in a middle portion of the assay test strip that is positioned vertically below the sample well 320. This rib 309 can support this portion of the assay test strip 200 without creating a pinch point, which may adversely affect the desired direction of fluid flow through the assay test strip 200.

The interaction between the compression points 306 and base supports 305 when the device 100 is assembled with the assay test strip 200 housed within the cartridge 300 compress portions of the assay test strip 200 and the separation membrane 214 in optimal locations to prevent flow of confounding components out of the separation membrane 214 and/or flow of the fluid sample out of edges 221 of the separation membrane 214. In some cases, the interaction between the compression points 306 and the base supports 305 can effectively seal confounding components within the separation membrane 214 while still allowing flow of the fluid sample from a top surface (the surface visible in the sample well 320, illustrated in FIG. 5 as top surface 219) through the bottom surface 220 of the separation membrane 214. Advantageously, the interaction between the compression points 306 and the base supports 305 can also prevent flow of the fluid sample across the top surface 219 of the separation membrane 214, where it may spread and leak onto the conjugate pad 212 in an uncontrolled fashion, allowing confounding components to pass with the analyte of interest into the conjugate pad 212 rather than being captured in the separation membrane 214.

The top housing 304 and the base housing 303 may be joined using any suitable method, including but not limited to by pressing the two housings together. In the non-limiting example illustrated in FIGS. 4A and 4B, the top housing 304 and the base housing 303 include complementary features 308. The features 308 facilitate alignment of the top housing 304 with the base housing 303 before press-fitting the housing together using press-fit connections. The features 308 may also control the amount of compression provided to select locations of the assay test strip 200 and the separation membrane 214 when the two housings are pressed together. The present disclosure is not limited to the press-fit features 308 illustrated in FIGS. 4A and 4B. Additional or different features may also be present to facilitate coupling of the base housing 303 and the top housing 304 in alignment with the assay test strip 200, including but not limited to lips, ledges, tabs, guides, or other features configured to align and compress the assay test strip within the cartridge 300.

Figure 5:
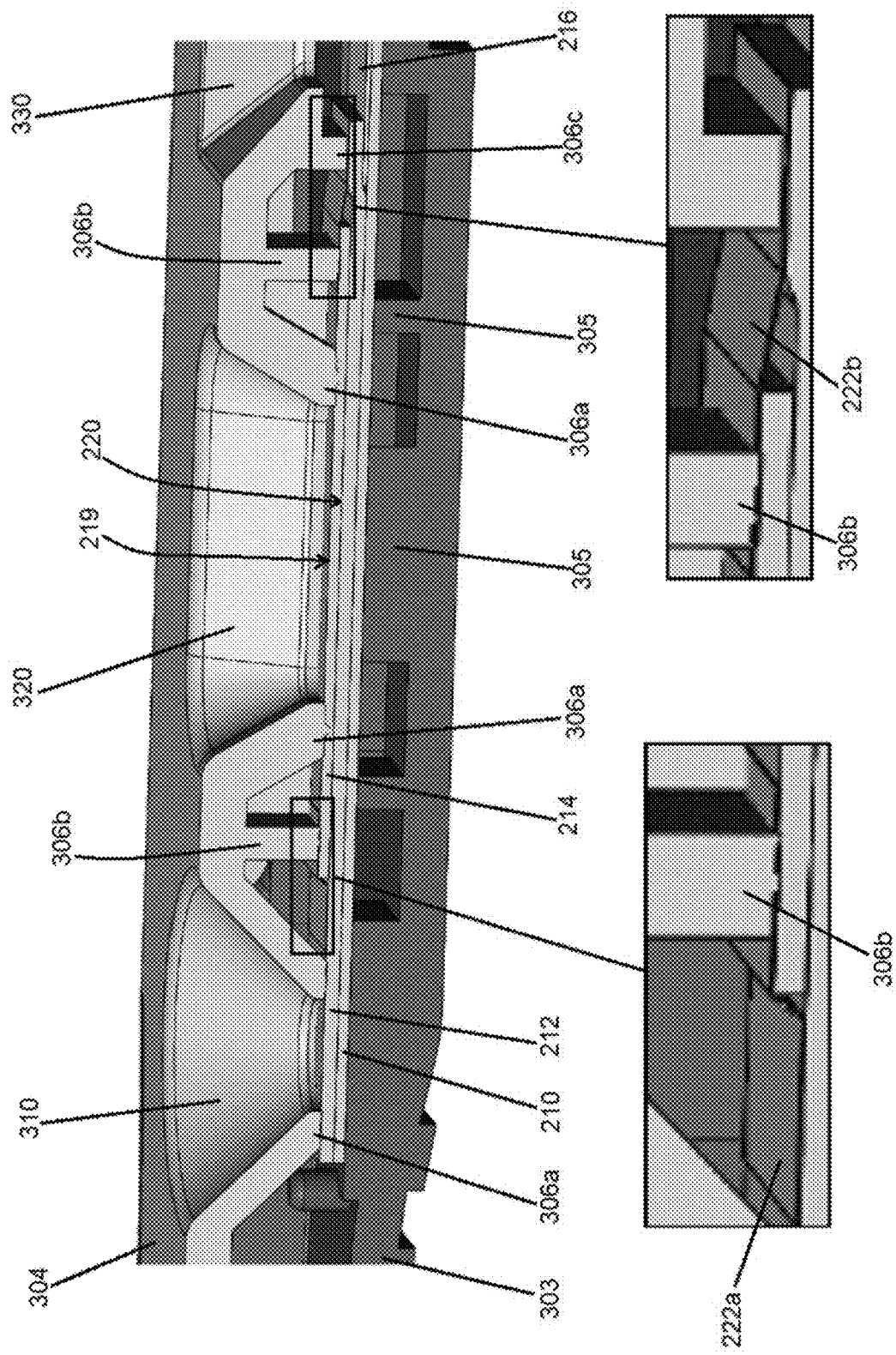
FIG. 5 illustrates an exploded partial view of an example lateral flow device according to the present disclosure.

Non-limiting examples of compression points 306 of the cartridge 300 according to the present disclosure will now be described with reference to FIG. 5. The compression points 306 are strategically located to compress or apply pressure to the assay test strip 200, including to the separation membrane 214. For example, in the embodiment shown in FIG. 4A, the compression surfaces 306a are located around and near the sample well 320 and buffer well 310. As shown in FIG. 5, the compression surfaces 306a arranged around the buffer well 310 contact the conjugate pad 212. The compression surfaces 306a arranged around the sample well 320 contact the separation membrane 214. The compression posts 306b contact adhesive 222a and an upstream portion of adhesive 222b. The compression bar 306c contacts a downstream portion of adhesive 222b.

The compression points 306 can apply an optimized amount of pressure to keep the separation membrane 214 fixed in place. Advantageously, the compression points 306 can also ensure that when sample is placed in the sample well 320, the sample passes through the top surface 219, passes through the separation membrane 214 in a direction generally transverse to the top surface 219, and out the bottom surface 220 onto the conjugate pad 212, rather than flowing horizontally across the top surface 219 of the separation membrane 214. This compression according to embodiments of the present disclosure has been found to advantageously prevent leakage of the sample out the edges 221 of the separation membrane 214. Furthermore, sufficient pressure is applied by the compression points 306 to allow flow of the sample through the separation membrane 214, while also providing sufficient flexibility of the separation membrane 214 to allow proper functioning of the separation membrane 214. In addition, the compression points 306 interact with base supports 305, which collectively can provide an optimized tension throughout the separation membrane 214 to prevent confounding components, such as red blood cells, from flowing through the separation membrane 214 to the conjugate pad 212. Although advantageous effects of compression points 306 have been described, it will be understood that embodiments of the present disclosure are not limited to cartridges 300 that include compression points 306.

In some embodiments, one or more components of a sample move more slowly through the separation membrane 214 than the one or more analytes of interest. In some embodiments, one or more components of a sample are unable to pass through the separation membrane 214. In some embodiments, analyte of interest passes through the separation membrane 214 toward and/or onto the assay test strip more rapidly than other components, such as confounding components, pass through the separation membrane 214. In some embodiments, the separation membrane 214 comprises a filter, a membrane, a matrix, and/or a pad capable of separating components of a sample based on capillarity. Although the present disclosure is not limited to any particular mechanism of action and an understanding of the mechanism of action is not necessary to practice the present disclosure, movement of a liquid through a separation membrane may be by capillary action or other action. In some embodiments, different liquids and different components of a liquid, move through a separation membrane at different rates based on the liquid-air surface tension and the density of the liquids. In some embodiments, analyte of interest moves more quickly through a separation membrane than other components, including confounding components.

In some embodiments of the present disclosure, the separation membrane 214 includes a plasma separation membrane. In some embodiments, the separation membrane 214 is a fiber membrane, a polysulfone membrane, a single layer matrix membrane, a bound glass fiber membrane, a binderless microglass membrane, a microglass with latex acrylic binder membrane, a bound borosilicate glass microfiber membrane, a spun bonded polyester membrane, a hydrophilic wet laid polyester membrane, or a glass fiber membrane, or a combination or analogues thereof. In some embodiments, the separation membrane includes a VIVID™ Plasma Separation Membrane by Pall®. In some embodiments, the separation membrane is a VIVID™ GR Plasma Separation Membrane by Pall®.

In some embodiments, the separation membrane 214 is configured to separate a defined volume of fluid sample (such as but not limited to 50 μL, 55 μL, 60 μL, 65 μL, 70 μL, 75 μL, 80 μL, 85 μL, 90 μL, 95 μL, or 100 μL). In some embodiments, the separation membrane 214 is of sufficient size, shape, and configuration to be employed with the cartridge 300 described herein (or any other suitable cartridge), and to be positioned over the assay test strip 200, such as generally vertically above or upstream of the labeling zone of the conjugate pad 212 of the assay test strip, such that fluid sample that passes through the bottom surface 220 of the separation membrane 214 passes through the labeling zone of the conjugate pad 212, where analyte of interest, if present, will bind with labeled conjugate. The separation membrane is not limited to the materials described herein, and any material that separates confounding components is suitable for use in embodiments of the present disclosure.

Advantageously, in embodiments where the separation membrane 214 is a plasma separation membrane, the dimensions of the plasma separation membrane 214 and the conjugate pad 212 can be adjusted to determine the volume of plasma that takes part in the subsequent immunoassay reactions. Example dimensions of a plasma separation membrane that result in an optimized volume of plasma flowing to the detection zone are described below with reference to Example 1. It will be understood that assay test strips having varying dimensions can be employed in embodiments of the present disclosure. For example, assay test strip can be narrower or wider than example dimensions described herein. Dimensions of the assay test strip of the present disclosure can also be adjusted to accommodate smaller or larger samples.

Embodiments of the present disclosure that include a double-sided adhesive 222 will now be described with reference to FIGS. 5 and 6. It has been advantageously discovered that retention of confounding components within the separation membrane is enhanced when a double-sided adhesive is used to fasten the separation membrane 214 to the conjugate pad 212. In one non-limiting example illustrated in FIG. 5, an upstream portion of the separation membrane 214 can be adhered to the conjugate pad 212 using a piece of double-sided adhesive 222a that is placed on a top surface of the conjugate pad 212 and the top surface 219 of the separation membrane 214. The downstream portion of adhesive 222a is located between a compression post 306b and the separation membrane 214. The compression post 306b can be positioned to compress the downstream portion of adhesive 222a onto the top surface of the upstream portion of the separation membrane 214. A downstream portion of the separation membrane 214 can be adhered to the conjugate pad 212 using a piece of double-sided adhesive 222b that is placed on a top surface of the conjugate pad 212 and the top surface 219 of the separation membrane 214. The upstream portion of adhesive 222b is located between a compression post 306b and the separation membrane 214. The compression post 306b can be positioned to compress the upstream portion of adhesive 222b onto the top surface of the downstream portion of the separation membrane 214. In addition, the compression bar 306c can be positioned to compress the downstream portion of adhesive 222b onto the top surface of the downstream portion of the conjugate pad 212.

Figure 6:
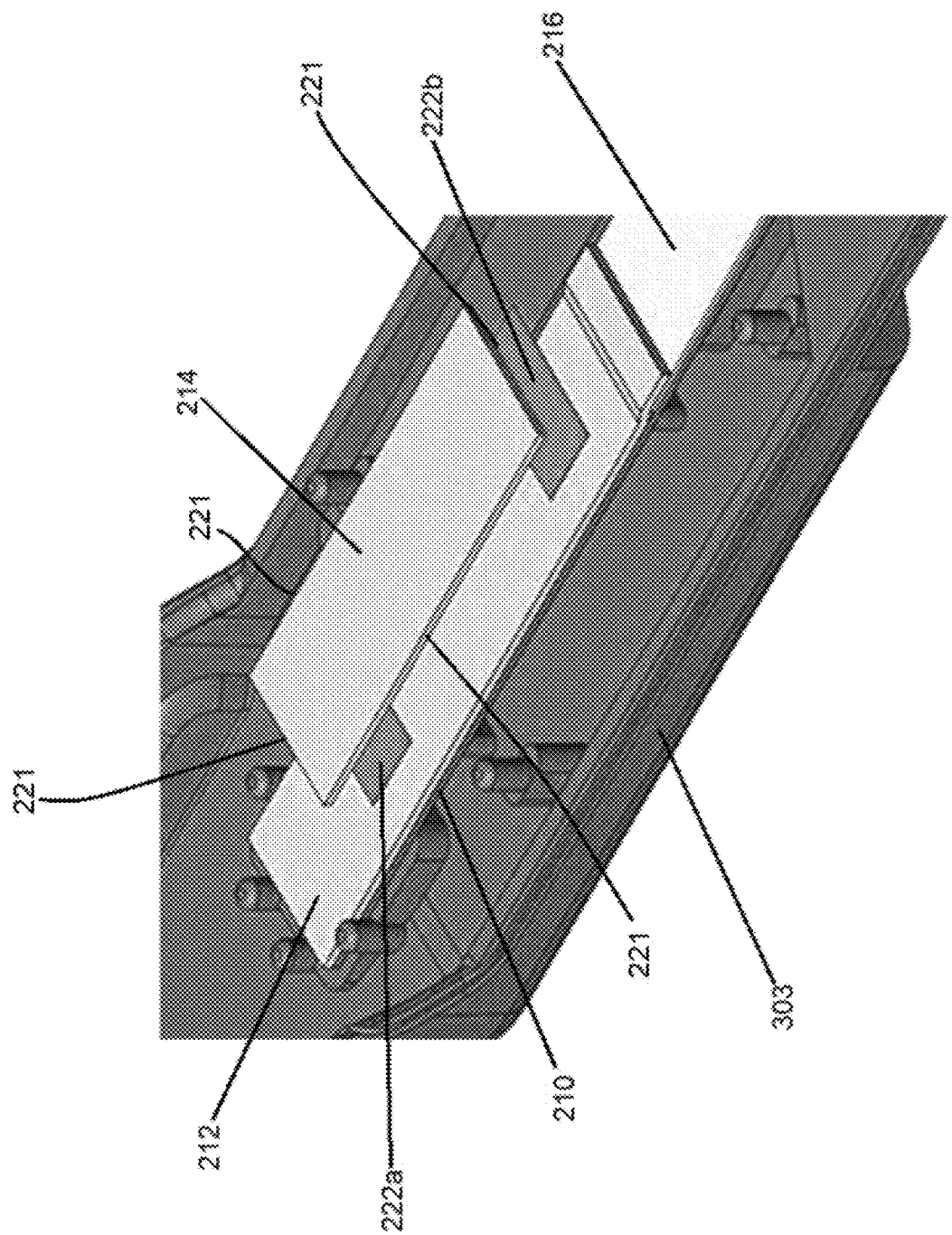
FIG. 6 illustrates a partial view of an example lateral flow assay device according to the present disclosure.

In another non-limiting embodiment illustrated in FIG. 6, an upstream portion of the separation membrane 214 is adhered to the conjugate pad 212 using a piece of double-sided adhesive 222a that is placed between a top surface of the conjugate pad 212 and the bottom surface 220 of the separation membrane 214. A downstream portion of the separation membrane 214 can be adhered to the conjugate pad 212 using a piece of double-sided adhesive 222b that is placed between a top surface of the conjugate pad 212 and the bottom surface 220 of the separation membrane 214. Embodiments of the assay test strip that adhere the separation membrane 214 of the present disclosure to the conjugate pad 212 have found to advantageously constrain confounding components in the separation membrane 214 more effectively. In one non-limiting example, a whole blood sample includes compounding components, such as red blood cells. In embodiments of the assay test strip 200 that include a double-sided adhesive, red blood cells are retained in the separation membrane 214 and do not leak out of the separation membrane 214 onto the conjugate pad 212, where they would otherwise interfere with movement of the analyte of interest through the assay test strip 200 or with detection of analyte of interest at the detection zone 217. Although advantageous effects of adhesive tape 222 have been described, it will be understood that embodiments of the present disclosure are not limited to assay test strips 200 that include adhesive tape 222.

The degree to which blood cell leakage was prevented was an unexpected result of assembling a whole blood filtration membrane in the manner described above with reference to FIG. 6. In particular, assembling a blood filtration membrane 214 on top of the conjugate pad 212 using double-faced adhesive tape strips prevented blood cell leakage from the ends of the membrane 214 that typically occurs when tape is applied over the top of the membrane 214.

Figure 7:
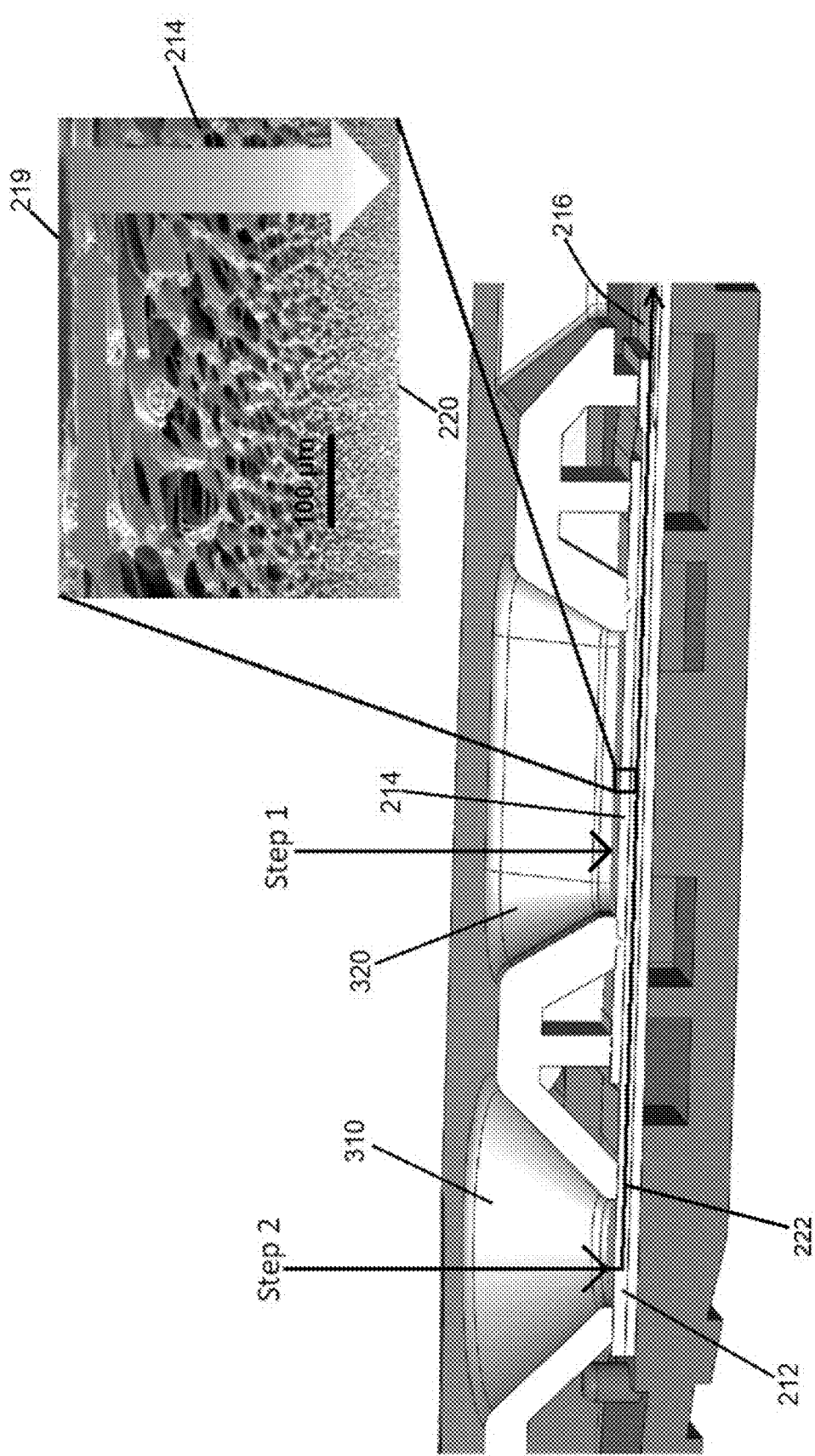
FIG. 7 illustrates a method of using the example lateral flow device of FIG. 5. The enlarged window of FIG. 7 depicts an enlarged view of an example separation membrane according the present disclosure.

An example method of detecting an analyte of interest will now be described with reference to FIG. 7. The enlarged window of FIG. 7 depicts an enlarged view of an exemplary separation membrane 214. The enlarged view illustrates a horizontal arrow indicating horizontal movement of fluid along the top surface 219 of the separation membrane 214 and a vertical arrow indicating vertical movement of fluid through the separation membrane 214 (a direction generally transverse to the top surface 219 and the bottom surface 220). In a first step, a fluid sample is added to the sample well 320, and the fluid sample contacts the separation membrane 214. In some cases, larger particles, such as but not limited to particulate matter and red blood cells, may flow horizontally along the surface of the separation membrane, as shown with the horizontal arrow. The particulate matter, however, generally does not flow vertically through the separation membrane 214 (generally does not flow in a direction transverse to the top surface 219 and the bottom surface 220), and therefore does not reach the conjugate pad 212. In one non-limiting embodiment, some quantity of particular matter does travel transversely along the direction indicated by the vertical arrow but reaches the conjugate pad in such small quantities that it does not interfere with detection of analyte of interest in the sample.

In contrast, analyte of interest flows into the top surface 219, through the separation membrane 214 in a direction generally transverse to the top surface 219, out the bottom surface 220 of the separation membrane 214, and onto the conjugate pad 212, as shown with the vertical arrow. Upon contacting the conjugate pad 212, labeled conjugate deposited on the conjugate pad 212 solubilizes and specifically binds to analyte of interest in the sample, if present, to form a label-conjugate-analyte complex.

In a second step, a second fluid, such as a chase buffer solution, is added to the buffer well 310 and contacts the conjugate pad 212. The second fluid flows downstream along the longitudinal axis of the assay test strip 200 in the direction of fluid flow through conjugate pad 212 (along the flow path generally indicated by arrow 222) and contacts analyte of interest that has reached the conjugate pad 212 through the separation membrane 214. The fluid front of the fluid, such as the buffer, carries the label-conjugate-analyte complex along the flow path indicated by arrow 222 through the conjugate pad 212 to the detection zone 217 of the assay membrane 216. Immobilized capture agent deposited at the detection zone 217 on the assay membrane 216 binds analyte of interest in the label-conjugate-analyte complex to form sandwich structures. Labeled conjugate accumulates at the detection zone 217 as sandwich structures are formed.

The signal generated at the detection zone 217 can be detected using any suitable measurement system, including but not limited to visual inspection of the device and optical detection using an optical reader. The detected signal can be correlated to the presence, absence, or quantity of the analyte of interest in the sample.

Advantageously, embodiments of the present disclosure can implement a commercially-available asymmetric porous membrane made of polysulfone (for example, the Vivid™ membrane by Pall®). Taking a non-limiting example of a whole blood sample, when whole blood is applied to one side of the membrane (such as the top surface 219 of membrane 214), and a suitable collecting material is in contact with the other side (such as the bottom surface 220 of membrane 214), plasma flows by means of capillary forces into the collecting material (for example, conjugate pad 212). Red and other blood cells can freely enter into the large "pores" on the upper surface of the separation membrane, but as the pores become smaller approaching the bottom surface of the membrane, they become trapped in the membrane. Thus, cell-free plasma is produced from the bottom of the separation membrane.

It is an advantage of this implementation of the present disclosure that fluid flow through the assay membrane 216 does not occur prior to adding the chase buffer solution to the buffer well 310. This provides an opportunity to have a defined incubation period in the assay. For example, in the context of a whole blood sample applied to a plasma separation membrane 214, the incubation period is the time during which the plasma specimen contacts, re-solubilizes, and reacts with dried colloidal gold conjugate in the labeling zone of the conjugate pad 212, prior to fluid flow to the detection zone 217 of the assay membrane 216. In some implementations, a user is provided with instruction to add a chase buffer to the buffer well in step 2 after a predefined time period, such as but not limited to 10 seconds, 20 seconds, 30 seconds, 40 seconds, 50 seconds, 1 minute, 2 minutes, 5 minutes, 10 minutes, or any other suitable period of time to allow analyte of interest in the sample to incubate with the labeled conjugate in the conjugate pad 212.

Accordingly, embodiments of the present disclosure can advantageously allow fluids to be added to an assay test strip in way in a way that prevents labeled conjugate from solubilizing until after compounding components in a sample have been removed, and then flushes label-conjugate-analyte complex along a flow path generally perpendicular to the direction of sample fluid flow through the separation membrane. The devices, systems, and methods of the present disclosure can effectively direct analytes of interest in a fluid sample to travel in a first direction through a separation membrane and then to travel in a second direction generally transverse to the second direction through a conjugate pad to a detection zone.

It is a further advantage of this implementation of the present disclosure that movement of the analyte of interest through the fluid flow path is achieved using a buffer solution that has a different flow path than the confounding components, in other words the present disclosure flows the buffer solution through the conjugate pad and not through the separation membrane. This avoids undesirable dilution of the analyte of interest in the sample, especially in cases where the analyte may be present in very low concentration. In prior technologies that attempt to address the presence of confounding components, additional fluid volume is necessary for adequate lateral flow and test strip clearing. Clogging of the membrane with separated blood red cells prevents buffer chase through the membrane. Typically, if chasing through the membrane is required, the blood is pre-diluted with buffer before application to the membrane. This reduces the concentration of red blood cells, allowing more fluid to pass through the membrane. This has the disadvantage, however, of also diluting any substance of interest that is to be measured, which can be problematic for substances present in very low concentrations. It is an advantage of implementations of the present disclosure that the step of chasing with buffer solution is only through the conjugate pad (spatially below and in fluid communication with the bottom surface of the separation membrane), thereby removing restrictions on buffer volume, and precluding any leakage of red blood cells into the conjugate pad. Implementations of the present disclosure also do not dilute the analyte of interest to be measured prior to mixing with the labeled conjugate. Thus, maximum sensitivity can be achieved in embodiments of the present disclosure.

Figure 8:
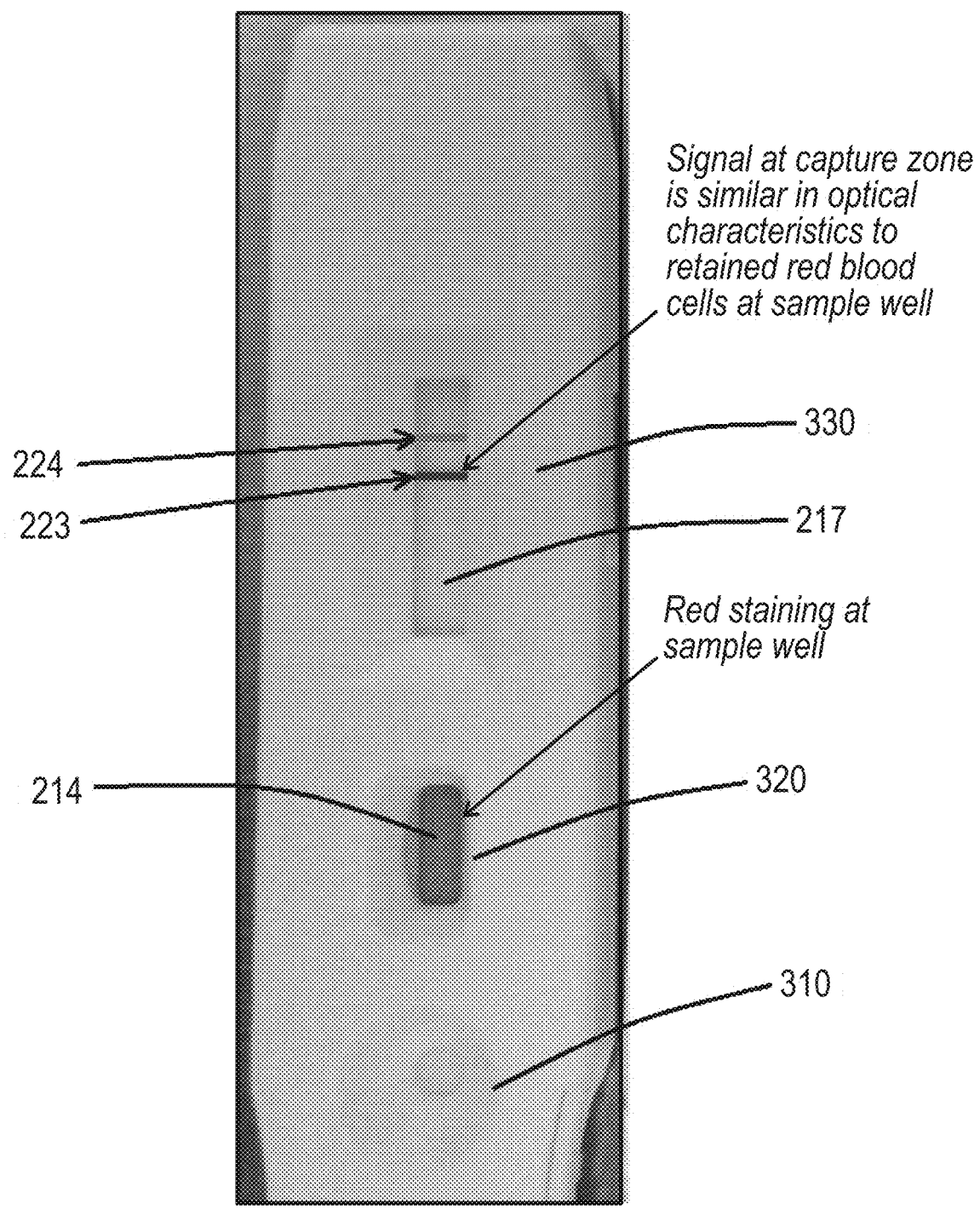
FIG. 8 illustrates a black-and-white version of a color photograph of an example lateral flow device according to the present disclosure. The color photograph and the black-and-white version of the color photograph (shown in FIG. 8) depict the similarities in optical properties of particulate matter retained in a separation membrane according to the present disclosure and an optical signal generated at a capture zone of the example lateral flow device.

FIG. 8 is a black-and-white version of a color photograph that depicts an example lateral flow assay of the present disclosure after a test sample was applied to sample well 320 and flowed to detection zone 217. The presence of an analyte of interest in the sample can be detected by visual inspection or optical detection using an optical reader through the read window 330. In this example, the test sample is a raw whole blood sample including red blood cells, which have optical characteristics similar to optical characteristics of gold nanoparticles, the detection agent implemented in this example implementation. Red blood cells were captured in the separation membrane 214 visible through the sample well 320, as shown in the color photograph (and in the black-and-white version of the color photograph shown in FIG. 8) with red staining at the sample well 320 due to the inability of red blood cells to pass through the separation membrane 214. In contrast, analyte of interest in the sample flowed vertically through the separation membrane 214 and bound to a labeled conjugate including a gold nanoparticle. The labeled conjugate specifically bound the analyte of interest to form label-conjugate-analyte complex. The label-conjugate-analyte complex flowed to the detection zone 217, where the label-conjugate-analyte complex was captured by immobilized capture agent at a capture zone 223. A detectable signal can be read through the read window 330 by determining a signal intensity at the capture zone 223. As shown in the color photograph and the black-and-white version of the color photograph (shown in FIG. 8), the signal at the capture zone 223 is similar in optical characteristics to the retained red blood cells at the sample well 320. FIG. 8 also depicts a control zone 224 at the read window 330.

Embodiments of the present disclosure can detect an analyte of interest present in a sample of small volume compared to milliliter-range blood samples typically required for a lateral flow test format. In the non-limiting implementation depicted in the color photograph and the black-and-white version of the color photograph (shown in FIG. 8), the volume of the whole blood sample is between about 50 μL and about 100 μL. In advantageous embodiments of the present disclosure, a small volume (for example but not limited to 50 μL and about 100 μL) of whole blood is transferred to the assay test strip directly from a fingerstick collection, also referred to as a fingerprick.

The ability to detect analytes of interest in a sample obtained by fingerprick and directly applied to embodiments of the present assay test strip offers significant advantages. Embodiments of the present disclosure can accept whole blood samples direct from the source, without any processing or treatment prior to application to the test strip, as described above. Additionally, embodiments of the present disclosure can detect analytes of interest in small volume samples, including samples ranging in volume between about 50 μL and about 100 μL, making capillary whole blood samples obtained by fingerstick a suitable specimen for application to the assay test strip of the present disclosure. Further, fingerstick blood samples are relatively convenient and easy to collect in the point of care setting. Still further, the risk of environmental contamination of the sample following collection of the fingerstick sample can be reduced because the fingerstick sample can be applied directly to the assay test strip of the present disclosure, without any processing or preparation of the sample.

As used herein, "analyte" generally refers to a substance to be detected. For instance, analytes may include antigenic substances, haptens, antibodies, and combinations thereof. Analytes include, but are not limited to, toxins, organic compounds, proteins, peptides, microorganisms, amino acids, nucleic acids, hormones, steroids, vitamins, drugs (including those administered for therapeutic purposes as well as those administered for illicit purposes), drug intermediaries or byproducts, bacteria, virus particles, and metabolites of or antibodies to any of the above substances. Specific examples of some analytes include ferritin; creatinine kinase MB (CK-MB); human chorionic gonadotropin (hCG); digoxin; phenytoin; phenobarbitol; carbamazepine; vancomycin; gentamycin; theophylline; valproic acid; quinidine; luteinizing hormone (LH); follicle stimulating hormone (FSH); estradiol, progesterone; C-reactive protein (CRP); lipocalins; IgE antibodies; cytokines; interferon-induced GTP-binding protein (also referred to as myxovirus (influenza virus) resistance 1, MX1, MxA, IFI-78K, IFI78, MX, MX dynamin like GTPase 1); procalcitonin (PCT); glycated hemoglobin (Gly Hb); cortisol; digitoxin; N-acetyl-procainamide (NAPA); procainamide; antibodies to rubella, such as rubella-IgG and rubella IgM; antibodies to toxoplasmosis, such as toxoplasmosis IgG (Toxo-IgG) and toxoplasmosis IgM (Toxo-IgM); testosterone; salicylates; acetaminophen; hepatitis B virus surface antigen (HBsAg); antibodies to hepatitis B core antigen, such as anti-hepatitis B core antigen IgG and IgM (Anti-HBC); human immune deficiency virus 1 and 2 (HIV 1 and 2); human T-cell leukemia virus 1 and 2 (HTLV); hepatitis B e antigen (HBeAg); antibodies to hepatitis B e antigen (Anti-HBe); influenza virus; thyroid stimulating hormone (TSH); thyroxine (T4); total triiodothyronine (Total T3); free triiodothyronine (Free T3); carcinoembryonic antigen (CEA); lipoproteins, cholesterol, and triglycerides; and alpha fetoprotein (AFP). Drugs of abuse and controlled substances include, but are not intended to be limited to, amphetamine; methamphetamine; barbiturates, such as amobarbital, secobarbital, pentobarbital, phenobarbital, and barbital; benzodiazepines, such as librium and valium; cannabinoids, such as hashish and marijuana; cocaine; fentanyl; LSD; methaqualone; opiates, such as heroin, morphine, codeine, hydromorphone, hydrocodone, methadone, oxycodone, oxymorphone and opium; phencyclidine; and propoxyhene. Additional analytes may be included for purposes of biological or environmental substances of interest.

In some embodiments, a sample may include one or more analyte of interest, and thus the lateral flow device may be configured for detecting one or more analyte of interest. In order to detect one or more analyte of interest, the lateral flow device described herein includes one or more labeled conjugates, wherein each labeled conjugate specifically binds to an analyte of interest. Thus, for example, a first labeled conjugate specifically binds to a first analyte of interest, a second labeled conjugate specifically binds to a second analyte of interest, a third labeled conjugate specifically binds to a third analyte of interest, and so forth for a desired number of analytes of interest present in the sample. In some embodiments, each labeled conjugate that specifically binds to an analyte of interest does not specifically bind to any other analyte of interest. Furthermore, in some embodiments, each labeled conjugate may have an identical label or a label that is different from each other labeled conjugate. Thus, for example, each labeled conjugate may include a unique label that is different from any other label of a labeled conjugate. Furthermore, where one or more analyte of interest is present, the lateral flow device may include one or more capture zones, each capture zone including immobilized capture agent that specifically binds analyte of interest. For example, a first immobilized capture agent specifically binds a first analyte of interest, a second immobilized capture agent specifically binds a second analyte of interest, a third immobilized capture agent specifically binds a third analyte of interest, and so on for a desired number of analytes of interest that are being analyzed in a test sample.

The following non-limiting examples illustrate features of lateral flow devices, test systems, and methods described herein, and are in no way intended to limit the scope of the present disclosure.

Example 1

Preparation of a Lateral Flow Assay Including a Separation Membrane

The following example demonstrates an embodiment of a lateral flow assay having a separation membrane. Components of a lateral flow assay were assembled on a backing card, which was subsequently cut into a strip of desired width. In this example, the card was a 300 mm×70 mm sheet of polystyrene (other suitable materials may be used) coated with a pressure sensitive adhesive (PAS). Onto a strip of 25 mm wide strip of nitrocellulose membrane, either backed with a thin Mylar film, or unbacked, were applied various test and control lines comprising antibodies or other binding partners at a desired spacing. The nitrocellulose strip was then adhered in a longitudinal orientation near the center of the card. A colloidal gold conjugate (for example, anti-analyte antibody coated on gold nanoparticles) was deposited on a 32 mm wide strip of conjugate pad material made of a porous material such as spun-bond polyester or glass fiber. This conjugate pad strip was adhered to the proximal edge of the card such that it overlapped the proximal end of the nitrocellulose membrane by about 2 mm. At the distal edge of the card, a 17 mm wide strip of absorbent pad made of cellulose was adhered so that it overlapped the distal end of the nitrocellulose membrane by about 2 mm. The overlaps provide for continuous fluid lateral flow between the various components assembled on the card.

A 20 mm wide strip of Pall Vivid GR plasma separation membrane was positioned over the conjugate pad, approximately 9 mm from the proximal edge of the card. The separation membrane was secured to the conjugate pad using two narrow (2-5 mm) strips of thin plastic film, coated on both sides with a PAS (for example, ARcare 9272, clear polyester double-sided adhesive tape, made by Adhesives Research, Inc.). These tape strips were positioned on the underside of the Vivid membrane, aligned with the proximal and distal edges. The use and placement of the PAS was important for preventing blood cell leakage through the device. For example, use of single-sided adhesive tape on top of the Vivid membrane creates a capillary space that leads to blood cell leakage from the edges of the Vivid membrane.

Finally, the cards were slit into 7 mm wide strips. The final strips were 7 mm wide by 70 mm long and contained sequentially from proximal to distal end: the conjugate pad with overlaid plasma separation membrane; the nitrocellulose membrane; and the absorbent (or wicking) pad. Lateral flow of a sample progresses from the proximal to distal end.

The strips were placed into an injection molded plastic housing (cassette). The housing was comprised of a lower part (base housing) and an upper part (top housing). The top housing contained openings that provide for buffer addition, blood addition, and optical reading of the completed assay, as depicted in FIG. 4A. The base housing contains a channel for precise registration of the test strip within the housing, as depicted in FIG. 4B. The internal surfaces of both top housing and base housing contain features that align with various physical components of the test strip. These features provide optimum compression in overlap areas, and an effective seal between the bottom of the sample well and the upper surface of the separation membrane. Such a seal prevents blood from leaking over the surface of the membrane and onto the conjugate pad. The housings are closed by pressing the tops and bottoms together. Physical features control the alignment and degree of compression of the two housing parts.

In order to run the assay, a fingerstick blood sample was obtained using a lancet. Using a self-filling pipette, such as a Microsafe Tube from Safe-Tec Clinical Products, or another suitable transfer device, 50 to 75 µL of whole blood were transferred from the fingerstick site to the sample well of the cassette. The blood sample was dispensed onto the upper surface of the plasma separation membrane. The large pores at the upper surface of the membrane allow the blood to flow laterally to fill the membrane, as depicted in FIG. 7. This provides for a large filtration area and maximized the efficiency of the plasma separation. The plasma immediately separates and flows into the conjugate pad via capillary forces. The plasma contacts labeled conjugate deposited on the conjugate pad.

Next, 100 µL of a chase buffer was added to the buffer well. The addition of buffer was delayed by a designated time interval to provide a desired incubation period for the analyte of interest in the sample to bind with the labeled conjugate. The buffer flowed through the conjugate pad, and carried the label-conjugate-analyte complex along the flow path to a detection zone. The flow of buffer occurred beneath the plasma separation membrane, and thus the red cells previously separated, were not disturbed. Label-conjugate-analyte complex flowed through the device and were bound to one or more test lines. Chase buffer continued to flow, washing the nitrocellulose and providing a clean background for detection of a signal, including faint detection signals. The driving force for lateral flow in the later stages of the assay is the absorption of fluid by the absorbent pad. Within about 10 minutes, equilibrium was reached. There was no further flow other than a small amount caused by evaporation. The cassette can be read within 5-10 minutes after buffer addition. Reading can be visual, or ideally with a digital electronic meter capable of detecting lines and performing such tasks as background subtraction.

Example 1

Preparation of a Lateral Flow Assay Including a Separation Membrane

Example 2 demonstrates preparation of a lateral flow assay for detecting an analyte of interest present in a raw unprocessed sample at low concentration. This example demonstrates an example lateral flow assay for detection of an analyte present in a raw unprocessed sample at high concentrations. In this example, the analyte is CRP and the sample is a whole blood sample.

CRP is a protein found in blood plasma. Levels of CRP rise in response to inflammation and infection. CRP is thus a marker for inflammation and infection that can be used to diagnose inflammation and infection. Elevated levels of CRP in the serum of a subject can be correlated to inflammation and/or bacterial infection in the subject. Normal levels of CRP in healthy human subjects range from about 1 µg/mL to about 10 µg/mL. Concentrations of CRP during mild inflammation and bacterial infection range from 10-40 µg/mL; during active inflammation and bacterial infection from 40-200 µg/mL; and in severe bacterial infections and burn cases greater than 200 µg/mL. Measuring and charting CRP levels be useful in determining disease progress or the effectiveness of treatments.

CRP is thus present in blood plasma across a large dynamic range, for example from low concentrations of about 1 µg/mL to about 10 µg/mL to very high concentrations of greater than 200 µg/mL. Although CRP can in some cases be measured with a high degree of sensitivity, such measurements typically have low specificity (for example, measuring CRP may be very sensitive to minute changes in concentration, but a single concentration measurement may correlate to more than one disease state or even no disease state (inflammation or other non-disease condition)). Embodiments of lateral flow devices, test systems, and methods described herein advantageously allow CRP to be measured with very high sensitivity in a whole blood sample. Some embodiments also relate to analyzing an analyte at high concentration, such as CRP, while simultaneously measuring concentration of an analyte of interest present at low concentration in the same whole blood sample.

To prepare the assay, gold nanoparticles were incubated with anti-CRP antibody to form anti-CRP coated nanoparticles. The antibody coated nanoparticles were subsequently incubated with an excess of CRP to form CRP antigen coated nanoparticles (CRP conjugate). The CRP conjugate, at a concentration of 15 OD, was deposited in an amount of 1.8 µL/test strip onto a conjugate pad (label zone) by spraying a solution including the complex with a BioDot AirJet.

In addition, the assay was prepared having a detection zone. The detection zone included an immobilized capture agent that specifically binds to CRP. In this example, anti-CRP antibody was deposited at the capture zone in an amount of 2.4 µg/µL using a BioDot FrontLine at an application rate of 0.75 µL/cm.

In this example, the detection zone also includes a positive control capture zone. The positive control capture zone is prepared to ensure that the assay functions properly. In this example, the positive control capture zone includes immobilized bovine serum albumin derivatized with biotin (BSA-biotin). The immobilized BSA-biotin captures labeled anti-biotin antibody present on the test strip that rehydrate with the fluid sample and flow to the positive control capture zone, indicating proper function of the assay. The labeled anti-biotin antibody is captured at the positive control zone, and a positive control signal indicates proper function of the assay.

Example 2

Detection of an Analyte of Interest in a Sample by Separating Components of a Sample Due to the presence of confounding components in a raw fluid sample, which interfere with the flow of sample and detection of analyte of interest, sandwich-type lateral flow assays are generally unsuitable to quantify the concentration of an analyte of interest present in low concentration in a raw fluid sample, or to quantify multiple analytes of interest when present in a sample of typical volume at any concentration. Using lateral flow devices, test systems, and methods described herein, however, the presence and concentration of an analyte of interest in a raw sample may be accurately, reliably, and rapidly determined.

Lateral flow assays were prepared in accordance with Example 1 of PCT Application No. PCT/US2018/039347, filed Jun. 25, 2018 and entitled "Sandwich-Type Assays Using Decreasing Signal Portions of Dose Response Curve to Measure Analytes, Including Analytes at High Concentration." The assay prepared according to this example can be used to determine the precise concentration of CRP (the analyte of interest) in a whole blood sample even when the concentration is above normal levels of CRP in healthy human subjects (about 1 µg/mL to about 10 µg/mL). The assay includes a labeled agent including an antibody-label-CRP complex that avoids several drawbacks of sandwich-type lateral flow assays, including drawbacks associated with the hook effect. A signal of maximum intensity is generated when the concentration of CRP in the sample is zero. For low concentrations of CRP, the lateral flow assays generate signals that are the same as or substantially equivalent to the maximum intensity signal. High concentrations of CRP generate signals that are less than the maximum intensity signal.

Figure 9A:
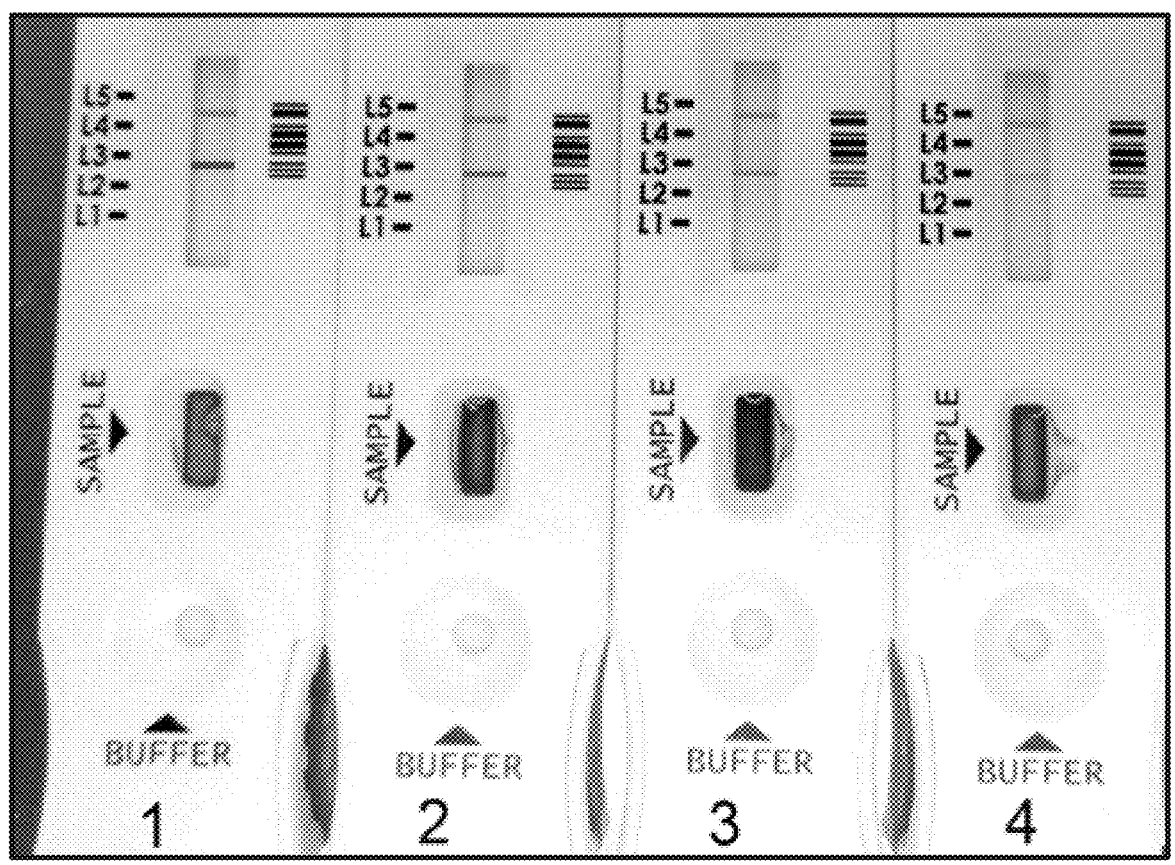
FIGS. 9A-9B illustrate results of an example method of determining a quantity of an analyte of interest using example lateral flow devices according to the present disclosure.

The lateral flow assays were contacted with unprocessed whole blood samples. Specifically, blood samples having varying concentration of C-reactive protein (CRP) were obtained. Blood samples having a 90 µL volume and four different concentrations of CRP were added to the sample well of four different devices prepared according to the present disclosure. A 100 µL volume of chase buffer was then added to the buffer well of each device. After ten minutes, digital images were obtained of the capture zones located within the read window. The images were electronically processed to obtain test line signals. The samples and read results are shown in Table 1, and depicted in FIGS. 9A-9B. FIG. 9A is a black and white version of a color photograph, but is otherwise identical to the color photograph.

| CRP (µg/mL) | Average Test Line Signal | Std Dev Test Line Signal |
|---|---|---|
| 0.0 | 44.5 | 4.1 |
| 44.2 | 13.5 | 13.5 |
| 88.5 | 8.0 | 2.2 |
| 132.7 | 6.5 | 1.6 |

Figure 9B:
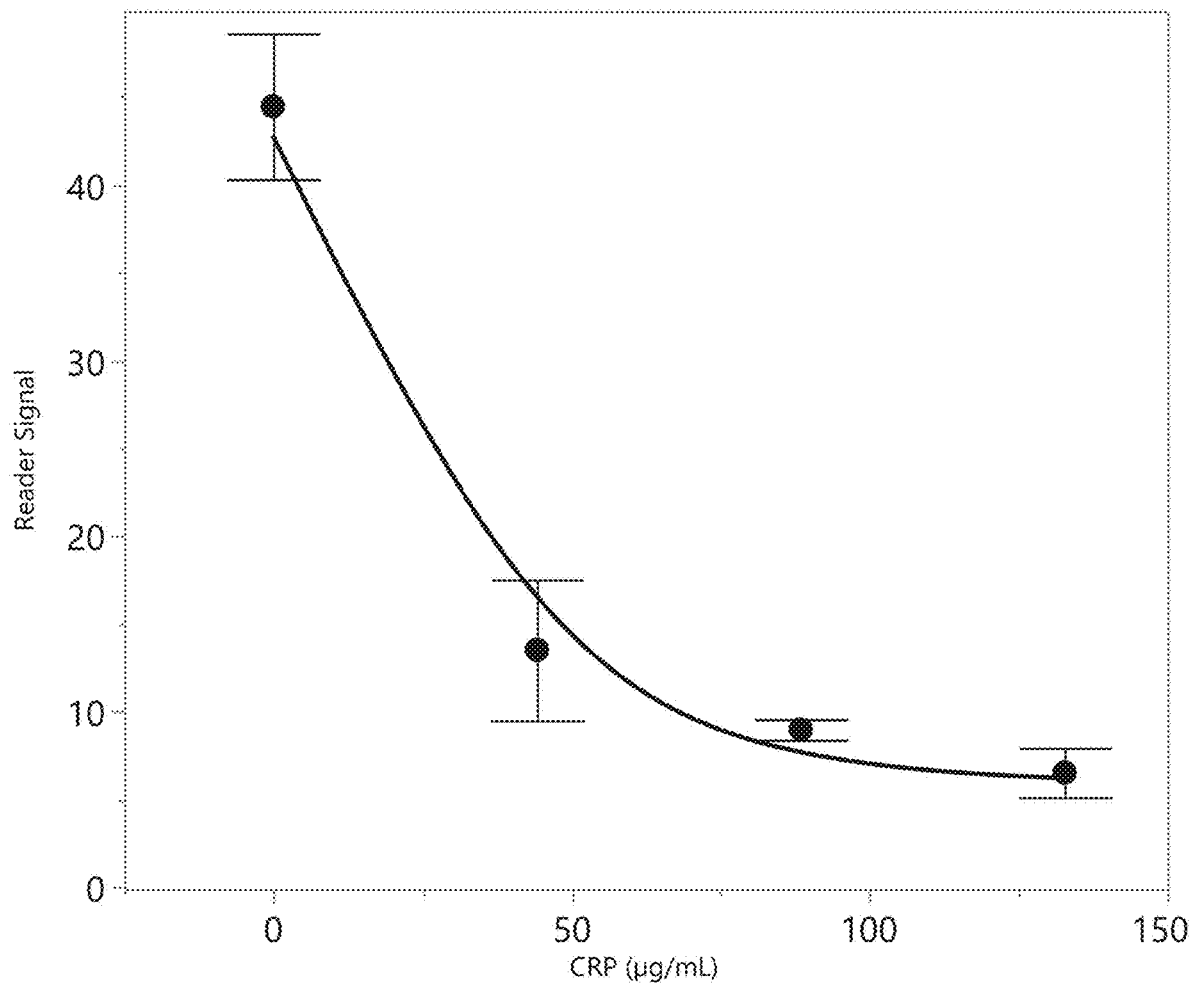

The results demonstrate that a maximum signal was obtained in the absence of CRP in the raw sample, the result of maximum binding of CRP antigen coated nanoparticles (conjugate) deposited on the test strip, which flowed to the detection zone and was bound by immobilized capture agent. As concentration of CRP in the raw sample increased, the unlabeled CRP competed with the CRP antigen conjugate at the detection zone, thereby decreasing the optical signal. Thus, as shown in the color photograph and the black-and-white version of the color photograph shown in FIG. 9A, as concentration of CRP in the sample increased from left to right (no CRP present in sample applied to Device 1, 44.2 μg/mL of CRP in sample applied to Device 2, 88.5 μg/mL of CRP in sample applied to Device 3, 132.7 μg/mL of CRP in sample applied to Device 4), the optical signal decreased. The dose response curve shown in FIG. 9B depicts the decrease in signal with increasing CRP concentration. Each error bar is constructed using 1 standard deviation from the mean.

The present disclosure relates to lateral flow assay devices, test systems, and methods to determine the presence and concentration of analytes in a sample. As discussed above, as used herein, "analyte" generally refers to a substance to be detected, for example a protein. Examples of proteins that can be detected by the lateral flow assay devices, test systems, and methods described herein include, without limitation:

CRP: C-reactive protein; representative RefSeq DNA sequences are NC_000001.11; NT_004487.20; and NC_018912.2 and a representative RefSeq Protein sequence accession numbers is NP_000558.2.

Antibodies for measuring CRP include monoclonal antibodies for measuring CRP and polyclonal antibodies for measuring CRP. Examples of monoclonal antibodies for measuring CRP include without limitation: Mouse, Monoclonal (108-2A2); Mouse, Monoclonal (108-7G41D2); Mouse, Monoclonal (12D-2C-36), IgG1; Mouse, Monoclonal (1G1), IgG1; Mouse, Monoclonal (5A9), IgG2a kappa; Mouse, Monoclonal (63F4), IgG1; Mouse, Monoclonal (67A1), IgG1; Mouse, Monoclonal (8B-5E), IgG1; Mouse, Monoclonal (B893M), IgG2b, lambda; Mouse, Monoclonal (C1), IgG2b; Mouse, Monoclonal (C11F2), IgG; Mouse, Monoclonal (C2), IgG1; Mouse, Monoclonal (C3), IgG1; Mouse, Monoclonal (C4), IgG1; Mouse, Monoclonal (C5), IgG2a; Mouse, Monoclonal (C6), IgG2a; Mouse, Monoclonal (C7), IgG1; Mouse, Monoclonal (CRP103), IgG2b; Mouse, Monoclonal (CRP11), IgG1; Mouse, Monoclonal (CRP135), IgG1; Mouse, Monoclonal (CRP169), IgG2a; Mouse, Monoclonal (CRP30), IgG1; Mouse, Monoclonal (CRP36), IgG2a; Rabbit, Monoclonal (EPR283Y), IgG; Mouse, Monoclonal (KT39), IgG2b; Mouse, Monoclonal (N-a), IgG1; Mouse, Monoclonal (N1G1), IgG1; Monoclonal (P5A9AT); Mouse, Monoclonal (S5G1), IgG1; Mouse, Monoclonal (SB78c), IgG1; Mouse, Monoclonal (SB78d), IgG1 and Rabbit, Monoclonal (Y284), IgG.

Advantageously, the lateral flow assay according to the present disclosure allows the presence and concentration of analyte of interest to be accurately determined in a raw, unprocessed sample by removing confounding components, such as but not limited to red blood cells, from the sample. Thus, the lateral flow devices described herein quantify concentrations of an analyte in a sample in a single assay during a single test event, without the need to dilute the sample, process or prepare the sample, or obtain a high volume of the sample from the sample source.

Methods of Detecting an Analyte of Interest in a Sample using the Lateral Flow Assays According to the Present Disclosure Some embodiments provided herein relate to methods of using lateral flow assays to detect an analyte of interest in a raw sample. In some embodiments, the method includes providing a lateral flow assay as described herein. In some embodiments, the method includes applying a fluid sample to a lateral flow device described herein.

In some embodiments, applying a sample on the lateral flow device includes applying the sample at the sample well of the lateral flow device. In some embodiments, applying the sample at the sample well includes contacting a sample with a lateral flow assay. A sample may contact a lateral flow assay by introducing a sample to a sample well by external application, as with a dropper or other applicator. In some embodiments, a sample reservoir may be directly immersed in the sample, such as when a test strip is dipped into a container holding a sample. In some embodiments, a sample may be poured, dripped, sprayed, placed, or otherwise contacted with the sample reservoir.

In some embodiments, the method includes separating particulates from the fluid sample by passing the fluid sample through the separation membrane of the sample well, wherein the analyte of interest passes through the separation membrane to the assay strip. In some embodiments, the particulates include confounding components, including for example, red blood cells, particulates, cellular components, or cellular debris, or other components that impede the flow of sample through a device or interfere with a detection signal of a device. The separation membrane may separate components of the sample based on size, affinity to the membrane, or other characteristics as desired.

In some embodiments, the method includes labeling an analyte of interest with a labeled conjugate. The labeled conjugate may include an antibody that specifically binds an analyte of interest and a label. The labeled conjugate can be deposited on a conjugate pad (or label zone) below or downstream of the sample well. The labeled conjugate can be used to determine the presence and/or quantity of analyte that may be present in the sample. Additional labeled conjugates may also be included on the device, where the operator is interested in determining the presence and/or quantity of more analytes of interest. Thus, the device may include a second labeled conjugate that includes a second antibody that specifically binds a second analyte of interest and a label, and the device may also include a third labeled conjugate that includes a third antibody that specifically binds a third analyte of interest and a label, or more, depending on the number of analytes to be analyzed.

The labeled conjugate (or more than one labeled conjugate, if such is the case) can be integrated on the conjugate pad by physical or chemical bonds. The sample solubilizes the labeled conjugate after the sample is added to the sample reservoir, releasing the bonds holding the labeled conjugate to the conjugate pad. The labeled conjugate binds to the analyte of interest, if present in the sample, forming a complex.

In some embodiments, the method includes binding labeled analyte of interest to immobilized capture agents at a detection zone. In some embodiments, the method includes detecting a signal from the labeled analyte of interest bound to the immobilized capture agents in the detection zone. Upon addition of a buffer (such as a chase buffer, including HEPES, PBS, TRIS, or any other suitable buffer) the sample, including bound analyte of interest (complex), flows along the fluid front through the lateral flow assay to a detection zone. The detection zone may include a capture zone for capturing each complex (where more than one analyte of interest is to be detected and/or quantified). For example, the detection zone may include a first capture zone for capturing a first complex, a second capture zone for capturing a second complex, and a third capture zone for capturing a third complex. When first complex binds to first capture agent at the first capture zone, a first signal from the label is detected. The first signal may include an optical signal as described herein. The first signal may be compared to values on a dose response curve for the first analyte of interest, and the concentration of first analyte in the sample is determined.

In some embodiments, the sample is obtained from a source, including an environmental or biological source. In some embodiments, the sample is suspected of having one or more analytes of interest. In some embodiments, the sample is not suspected of having any analytes of interest. In some embodiments, a sample is obtained and analyzed for verification of the absence or presence of a plurality of analytes. In some embodiments, a sample is obtained and analyzed for the quantity of a plurality of analyte in the sample. In some embodiments, the quantity of any one of the one or more analytes present in a sample is less than a normal value present in healthy subjects, at or around a normal value present in healthy subjects, or above a normal value present in healthy subjects. In some embodiments, the fluid sample is an undiluted, whole blood sample; an undiluted venous blood sample; an undiluted capillary blood sample; an undiluted, serum sample; or an undiluted plasma sample. In some embodiments, the fluid sample is applied in an amount of 50 to 100 µL.

In some embodiments, the detected signal is an optical signal, a fluorescent signal, or a magnetic signal. In some embodiments, the device further comprises a buffer well. In some embodiments, the method further includes flowing the buffer through the assay strip to the analyte of interest.

In some embodiments, the analyte of interest is present in elevated concentrations. Elevated concentrations of analyte can refer to a concentration of analyte that is above healthy levels. Thus, elevated concentration of analyte can include a concentration of analyte that is 5%, 10%, 15%, 20%, 25%, 30%, 35%, 40%, 50%, 60%, 70%, 80%, 90%, 100%, 125%, 150%, 200%, or greater than a healthy level. In some embodiments, the analyte of interest includes an analyte as described herein. Additional analytes may be included for purposes of biological or environmental substances of interest.

Example Test Systems Including Lateral Flow Assays According to the Present Disclosure Lateral flow assay test systems described herein can include a lateral flow assay test device (such as but not limited to a test strip), a system housing including a port configured to receive all or a portion of the test device, a reader including a light source and a light detector, a data analyzer, and combinations thereof. A system housing may be made of any one of a wide variety of materials, including plastic, metal, or composite materials. The system housing forms a protective enclosure for components of the diagnostic test system. The system housing also defines a receptacle that mechanically registers the test strip with respect to the reader. The receptacle may be designed to receive any one of a wide variety of different types of test strips. In some embodiments, the system housing is a portable device that allows for the ability to perform a lateral flow assay in a variety of environments, including on the bench, in the field, in the home, or in a facility for domestic, commercial, or environmental applications.

A reader may include one or more optoelectronic components for optically inspecting the exposed areas of the detection zone of the test strip, and capable of detecting multiple capture zones within the detection zone. In some implementations, the reader includes at least one light source and at least one light detector. In some embodiments, the light source may include a semiconductor light-emitting diode and the light detector may include a semiconductor photodiode. Depending on the nature of the label that is used by the test strip, the light source may be designed to emit light within a particular wavelength range or light with a particular polarization. For example, if the label is a fluorescent label, such as a quantum dot, the light source would be designed to illuminate the exposed areas of the capture zone of the test strip with light in a wavelength range that induces fluorescent emission from the label. Similarly, the light detector may be designed to selectively capture light from the exposed areas of the capture zone. For example, if the label is a fluorescent label, the light detector would be designed to selectively capture light within the wavelength range of the fluorescent light emitted by the label or with light of a particular polarization. On the other hand, if the label is a reflective-type label, the light detector would be designed to selectively capture light within the wavelength range of the light emitted by the light source. To these ends, the light detector may include one or more optical filters that define the wavelength ranges or polarizations axes of the captured light. A signal from a label can be analyzed, using visual observation or a spectrophotometer to detect color from a chromogenic substrate; a radiation counter to detect radiation, such as a gamma counter for detection of $^{125}$I; or a fluorometer to detect fluorescence in the presence of light of a certain wavelength. Where an enzyme-linked assay is used, quantitative analysis of the amount of an analyte of interest can be performed using a spectrophotometer. Lateral flow assays described herein can be automated or performed robotically, if desired, and the signal from multiple samples can be detected simultaneously. Furthermore, multiple signals can be detected in for plurality of analytes of interest, including when the label for each analyte of interest is the same or different.

The data analyzer processes the signal measurements that are obtained by the reader. In general, the data analyzer may be implemented in any computing or processing environment, including in digital electronic circuitry or in computer hardware, firmware, or software. In some embodiments, the data analyzer includes a processor (e.g., a microcontroller, a microprocessor, or ASIC) and an analog-to-digital converter. The data analyzer can be incorporated within the housing of the diagnostic test system. In other embodiments, the data analyzer is located in a separate device, such as a computer, that may communicate with the diagnostic test system over a wired or wireless connection. The data analyzer may also include circuits for transfer of results via a wireless connection to an external source for data analysis or for reviewing the results.

In general, the results indicator may include any one of a wide variety of different mechanisms for indicating one or more results of an assay test. In some implementations, the results indicator includes one or more lights (e.g., light-emitting diodes) that are activated to indicate, for example, the completion of the assay test. In other implementations, the results indicator includes an alphanumeric display (e.g., a two or three character light-emitting diode array) for presenting assay test results.

Test systems described herein can include a power supply that supplies power to the active components of the diagnostic test system, including the reader, the data analyzer, and the results indicator. The power supply may be implemented by, for example, a replaceable battery or a rechargeable battery. In other embodiments, the diagnostic test system may be powered by an external host device (e.g., a computer connected by a USB cable).

Features of Example Lateral Flow Devices

Lateral flow devices described herein include device housing. The housing of any of the lateral flow devices described herein, including the top housing or the base housing, may be made with any suitable material, including, for example, vinyl, nylon, polyvinyl chloride, polypropylene, polystyrene, polyethylene, polycarbonates, polysulfanes, polyesters, urethanes, or epoxies. The housing may be prepared by any suitable method, including, for example, by injection molding, compression molding, transfer molding, blow molding, extrusion molding, foam molding, thermoform molding, casting, layer deposition, or printing.

Lateral flow devices described herein can include a sample well (also referred to as a sample receiving zone) where a fluid sample is introduced to a test strip, such as but not limited to an immunochromatographic test strip present in a lateral flow device. In one example, the sample may be introduced to the sample well by external application, as with a dropper or other applicator. The sample may be poured or expressed onto the sample well. In another example, the sample well may be directly immersed in the sample, such as when a test strip is dipped into a container holding a sample.

Lateral flow devices described herein can include a solid support or substrate. Suitable solid supports include but are not limited to nitrocellulose, the walls of wells of a reaction tray, multi-well plates, test tubes, polystyrene beads, magnetic beads, membranes, and microparticles (such as latex particles). Any suitable porous material with sufficient porosity to allow access by labeled conjugates and a suitable surface affinity to immobilize capture agents can be used in lateral flow devices described herein. For example, the porous structure of nitrocellulose has excellent absorption and adsorption qualities for a wide variety of reagents, for instance, capture agents. Nylon possesses similar characteristics and is also suitable. Microporous structures are useful, as are materials with gel structure in the hydrated state.

Further examples of useful solid supports include: natural polymeric carbohydrates and their synthetically modified, cross-linked or substituted derivatives, such as agar, agarose, cross-linked alginic acid, substituted and cross-linked guar gums, cellulose esters, especially with nitric acid and carboxylic acids, mixed cellulose esters, and cellulose ethers; natural polymers containing nitrogen, such as proteins and derivatives, including cross-linked or modified gelatins; natural hydrocarbon polymers, such as latex and rubber; synthetic polymers which may be prepared with suitably porous structures, such as vinyl polymers, including polyethylene, polypropylene, polystyrene, polyvinylchloride, polyvinylacetate and its partially hydrolyzed derivatives, polyacrylamides, polymethacrylates, copolymers and terpolymers of the above polycondensates, such as polyesters, polyamides, and other polymers, such as polyurethanes or polyepoxides; porous inorganic materials such as sulfates or carbonates of alkaline earth metals and magnesium, including barium sulfate, calcium sulfate, calcium carbonate, silicates of alkali and alkaline earth metals, aluminum and magnesium; and aluminum or silicon oxides or hydrates, such as clays, alumina, talc, kaolin, zeolite, silica gel, or glass (these materials may be used as filters with the above polymeric materials); and mixtures or copolymers of the above classes, such as graft copolymers obtained by initializing polymerization of synthetic polymers on a pre-existing natural polymer.

Lateral flow devices described herein can include porous solid supports, such as nitrocellulose, in the form of sheets or strips. The thickness of such sheets or strips may vary within wide limits, for example, from about 0.01 to 0.5 mm, from about 0.02 to 0.45 mm, from about 0.05 to 0.3 mm, from about 0.075 to 0.25 mm, from about 0.1 to 0.2 mm, or from about 0.11 to 0.15 mm. The pore size of such sheets or strips may similarly vary within wide limits, for example from about 0.025 to 15 microns, or more specifically from about 0.1 to 3 microns; however, pore size is not intended to be a limiting factor in selection of the solid support. The flow rate of a solid support, where applicable, can also vary within wide limits, for example from about 12.5 to 90 sec/cm (i.e., 50 to 300 sec/4 cm), about 22.5 to 62.5 sec/cm (i.e., 90 to 250 sec/4 cm), about 25 to 62.5 sec/cm (i.e., 100 to 250 sec/4 cm), about 37.5 to 62.5 sec/cm (i.e., 150 to 250 sec/4 cm), or about 50 to 62.5 sec/cm (i.e., 200 to 250 sec/4 cm). In specific embodiments of devices described herein, the flow rate is about 35 sec/cm (i.e., 140 sec/4 cm). In other specific embodiments of devices described herein, the flow rate is about 37.5 sec/cm (i.e., 150 sec/4 cm).

The surface of a solid support may be activated by chemical processes that cause covalent linkage of an agent (e.g., a capture reagent) to the support. As described below, the solid support can include a conjugate pad. Many other suitable methods may be used for immobilizing an agent (e.g., a capture reagent) to a solid support including, without limitation, ionic interactions, hydrophobic interactions, covalent interactions and the like.

Except as otherwise physically constrained, a solid support may be used in any suitable shapes, such as films, sheets, strips, or plates, or it may be coated onto or bonded or laminated to appropriate inert carriers, such as paper, glass, plastic films, or fabrics.

Lateral flow devices described herein can include a conjugate pad, such as a membrane or other type of material that includes a capture reagent. The conjugate pad can be a cellulose acetate, cellulose nitrate, polyamide, polycarbonate, glass fiber, membrane, polyethersulfone, regenerated cellulose (RC), polytetra-fluorethylene, (PTFE), Polyester (e.g. Polyethylene Terephthalate), Polycarbonate (e.g., 4,4-hydroxy-diphenyl-2,2'-propane), Aluminum Oxide, Mixed Cellulose Ester (e.g., mixture of cellulose acetate and cellulose nitrate), Nylon (e.g., Polyamide, Hexamethylenediamine, and Nylon 66), Polypropylene, PVDF, High Density Polyethylene (HDPE)+nucleating agent "aluminum dibenzoate" (DBS) (e.g. 80 u 0.024 HDPE DBS (Porex)), and HDPE.

Lateral flow devices described herein are highly sensitive to an analyte of interest present in a sample, including to one or more analyte of interest present at significantly different concentrations, such as at high concentrations (in the 10s to 100s of µg/mL) and at low concentrations (in the 1s to 10s of pg/mL). "Sensitivity" refers to the proportion of actual positives that are correctly identified as such (for example, the percentage of infected, latent, or symptomatic subjects who are correctly identified as having a condition). Sensitivity may be calculated as the number of true positives divided by the sum of the number of true positives and the number of false negatives.

Lateral flow devices described herein can accurately measure a plurality of analytes of interest in many different kinds of samples. Samples can include a specimen or culture obtained from any source, as well as biological and environmental samples. Biological samples may be obtained from animals (including humans) and encompass fluids, solids, tissues, and gases. As described above, a sample may be processed prior to being applied to a lateral flow device of the present disclosure. In a first non-limiting example, a whole blood sample can be processed to obtain plasma or serum, and the plasma or serum can be applied to a lateral flow device according to the present disclosure. In a second non-limiting example, a sample containing cells is processed using one or more sample preparation steps, such as but not limited to a cell lysis step to release intracellular proteins for detection. The processed sample can be applied to a lateral flow device according to the present disclosure. Embodiments of the present disclosure can advantageously remove confounding components in samples that have been mechanically processed, such as plasma and serum samples, and in samples that have been chemically processed, such as samples that have been mixed with reagents. Biological samples include urine, saliva, and blood products, such as plasma, serum and the like. Such examples are not however to be construed as limiting the sample types applicable to the present disclosure.

Lateral flow devices described herein can include a label. Labels can take many different forms, including a molecule or composition bound or capable of being bound to an analyte, analyte analog, detector reagent, or binding partner that is detectable by spectroscopic, photochemical, biochemical, immunochemical, electrical, optical or chemical means. Examples of labels include enzymes, colloidal gold particles (also referred to as gold nanoparticles), colored latex particles, radioactive isotopes, co-factors, ligands, chemiluminescent or fluorescent agents, protein-adsorbed silver particles, protein-adsorbed iron particles, protein-adsorbed copper particles, protein-adsorbed selenium particles, protein-adsorbed sulfur particles, protein-adsorbed tellurium particles, protein-adsorbed carbon particles, and protein-coupled dye sacs. The attachment of a compound (e.g., a detector reagent) to a label can be through covalent bonds, adsorption processes, hydrophobic and/or electrostatic bonds, as in chelates and the like, or combinations of these bonds and interactions and/or may involve a linking group. The lateral flow assays and devices described herein include separation membranes for removing confounding components, including components that have the same or similar optical characteristics as the optical characteristics of the label. For example, red blood cells, having hemoglobin present, have a similar optical characteristic as gold nanoparticles. Thus, in some embodiments, when gold nanoparticles are used for detecting a signal, red blood cells can be separated using the separation membrane according to the present disclosure. Similarly, other metal nanoparticles, including silver, platinum, copper, palladium, ruthenium, rhenium, or other metal nanoparticles generate specific signals whose detection may be similarly enhanced by removing confounding components from a sample in accordance with the present disclosure.

The term "specific binding partner (or binding partner)" refers to a member of a pair of molecules that interacts by means of specific, noncovalent interactions that depend on the three-dimensional structures of the molecules involved. Typical pairs of specific binding partners include antigen/antibody, hapten/antibody, hormone/receptor, nucleic acid strand/complementary nucleic acid strand, substrate/enzyme, inhibitor/enzyme, carbohydrate/lectin, biotin/(strept) avidin, receptor/ligands, and virus/cellular receptor, or various combinations thereof.

As used herein, the terms "immunoglobulin" or "antibody" refer to proteins that bind a specific antigen. Immunoglobulins include, but are not limited to, polyclonal, monoclonal, chimeric, and humanized antibodies, Fab fragments, F(ab'2 fragments, and includes immunoglobulins of the following classes: IgG, IgA, IgM, IgD, IbE, and secreted immunoglobulins (sIg). Immunoglobulins generally comprise two identical heavy chains and two light chains. However, the terms "antibody" and "immunoglobulin" also encompass single chain antibodies and two chain antibodies.

For simplicity, through the specification the terms "labeled antibody" or "capture antibody" is used, but the term antibody as used herein refers to the antibody as a whole or any fragment thereof. Thus, it is contemplated that when referring to a labeled antibody that specifically binds analyte of interest, the term refers to a labeled antibody or fragment thereof that specifically binds an analyte of interest. Similarly, when referring to a capture antibody, the term refers to a capture antibody or fragment thereof that specifically binds to the analyte of interest.

Antibodies in lateral flow devices, test systems, and methods according to the present disclosure can include a polyclonal antibody. Polyclonal antibodies for measuring any of the analytes of interest disclosed herein include without limitation antibodies that were produced from sera by active immunization of one or more of the following: Rabbit, Goat, Sheep, Chicken, Duck, Guinea Pig, Mouse, Donkey, Camel, Rat, and Horse. Antibodies in lateral flow devices, test systems, and methods according to the present disclosure can include a monoclonal antibody. Antibodies for binding to analytes of interest are known in the art or may be readily developed by methods known in the art.

Lateral flow devices according to the present disclosure include a capture agent. A capture agent includes an immobilized capture agent that is capable of binding to an analyte, including a free (unlabeled) analyte and/or a labeled analyte (such as analyte bound to a labeled conjugate, as described herein). A capture agent includes an unlabeled specific binding partner that is specific for (i) a analyte of interest bound by the labeled conjugate, (ii) free analyte, or for (iii) an ancillary specific binding partner, which itself is specific for the analyte, as in an indirect assay. As used herein, an "ancillary specific binding partner" is a specific binding partner that binds to the specific binding partner of an analyte. For example, an ancillary specific binding partner may include an antibody specific for another antibody, for example, goat anti-human antibody. Lateral flow devices described herein can include a "detection area" or "detection zone" that is an area that includes one or more capture area or capture zone and that is a region where a detectable signal may be detected. Lateral flow devices described herein can include a "capture area" that is a region of the lateral flow device where the capture reagent is immobilized. Lateral flow devices described herein may include more than one capture area. In some cases, a different capture reagent will be immobilized in different capture areas (such as a first capture reagent at a first capture area and a second capture agent at a second capture area). Multiple capture areas may have any orientation with respect to each other on the lateral flow substrate; for example, a first capture area may be distal or proximal to a second (or other) capture area along the path of fluid flow and vice versa. Alternatively, a first capture area and a second (or other) capture area may be aligned along an axis perpendicular to the path of fluid flow such that fluid contacts the capture areas at the same time or about the same time.

Lateral flow devices according to the present disclosure include capture agents that are immobilized such that movement of the capture agent is restricted during normal operation of the lateral flow device. For example, movement of an immobilized capture agent is restricted before and after a fluid sample is applied to the lateral flow device. Immobilization of capture agents can be accomplished by physical means such as barriers, electrostatic interactions, hydrogen bonding, bioaffinity, covalent interactions, or combinations thereof.

Lateral flow devices according to the present disclosure can detect, identify, and in some cases quantify a biologic. A biologic includes chemical or biochemical compounds produced by a living organism, including a prokaryotic cell line, a eukaryotic cell line, a mammalian cell line, a microbial cell line, an insect cell line, a plant cell line, a mixed cell line, a naturally occurring cell line, or a synthetically engineered cell line. A biologic can include large macromolecules such as proteins, polysaccharides, lipids, and nucleic acids, as well as small molecules such as primary metabolites, secondary metabolites, and natural products.

Various aspects of the devices, test systems, and methods of the present disclosure are described with reference to the figures. The disclosure may, however, be embodied in many different forms. Based on the teachings herein one skilled in the art should appreciate that the scope of the disclosure is intended to cover any aspect of the devices, test systems, and methods disclosed herein, whether implemented independently of or combined with any other aspect of the present disclosure. For example, a device may be implemented or a method may be practiced using any number of the aspects set forth herein.

Although particular aspects are described herein, many variations and permutations of these aspects fall within the scope of the disclosure. Although some benefits and advantages are mentioned, the scope of the disclosure is not intended to be limited to particular benefits, uses, or objectives. Rather, aspects of the disclosure are intended to be broadly applicable to different detection technologies and device configurations some of which are illustrated by way of example in the figures and in the description.

What is claimed is:

1. A lateral flow assay device for detecting an analyte of interest in a fluid sample comprising:
    a first flow path configured to receive the fluid sample, the first flow path extending between a top surface and a bottom surface of a membrane configured to retain particles in the fluid sample, the membrane comprising a plurality of edges between the top surface and the bottom surface;
    a second flow path extending from a buffer receiving zone through a sample receiving zone to a capture zone downstream of the sample receiving zone, the sample receiving zone comprising a conjugate comprising a label and an agent configured to specifically bind to the analyte of interest, the capture zone comprising an immobilized capture agent specific to the analyte of interest, the second flow path spatially below and in fluid communication with the bottom surface of the membrane, the buffer receiving zone configured to receive a buffer that directs the fluid sample received through the bottom surface of the membrane along the second flow path to the capture zone; and
    a cartridge defining a buffer well and a sample well in communication with the buffer receiving zone and the sample receiving zone, respectively, the cartridge comprising a plurality of compression structures comprising compression surfaces and compression posts, the compression surfaces comprising a bottom surface of the sample well in direct contact with the top surface of the membrane, the compression posts arranged upstream of the sample well and downstream of the sample well and above the top surface of the membrane, the compression surfaces and the compression posts configured to compress portions of the membrane and collectively generate a tension throughout the membrane that prevents leakage of the fluid sample out of the plurality of edges of the membrane and prevents the particles from flowing through the plurality of edges of the membrane to the second flow path.

2. The assay device of claim 1, wherein the first flow path is transverse to the second flow path.

3. The assay device of claim 1, wherein the membrane is configured to retain particles that obstruct the flow of the analyte of interest.

4. The assay device of claim 1, wherein the membrane is configured to retain particles that interfere with detection of the analyte of interest at the capture zone.

5. The assay device of claim 1, wherein the membrane is configured to retain particles based on the size of the particles and/or affinity of the particles to agents in the membrane.

6. The assay device of claim 1, wherein the sample receiving zone is spatially below and in fluid communication with the bottom surface of the membrane.

7. The assay device of claim 1, wherein the first flow path is configured to receive an undiluted, whole blood sample; an undiluted venous blood sample; an undiluted capillary blood sample; an undiluted, serum sample; or an undiluted plasma sample.

8. The assay device of claim 1, wherein the particles comprise red blood cells.

9. The assay device of claim 1, wherein the first flow path is configured to receive a volume of the fluid sample in an amount between about 50 µL and about 100 µL.

10. The assay device of claim 1, wherein the analyte of interest comprises C-reactive protein (CRP).

11. The assay device of claim 1, wherein the cartridge further comprises a read window positioned over the capture zone.

12. The assay device of claim 1, wherein the membrane is a size-exclusion membrane or an affinity membrane.

13. The assay device of claim 1, wherein the tension in the membrane generated by the compression surfaces and the compression posts prevents the particles from flowing across the top surface of the membrane and onto the second flow path.

14. The assay device of claim 1, wherein the second flow path comprises a conjugate pad in fluid communication with an assay membrane, the conjugate pad comprising the buffer receiving zone and the sample receiving zone, the assay membrane comprising the capture zone.

15. The assay device of claim 14, wherein the bottom surface of the membrane configured to retain particles is adhered to the top surface of the conjugate pad with double-sided adhesive.

16. The assay device of claim 1, wherein the membrane retains the particles in the fluid sample before the conjugate in the sample receiving zone solubilizes.

17. The assay device of claim 1, wherein particles in the fluid sample do not enter the second flow path.

18. The assay device of claim 1, wherein the membrane comprises an asymmetric plasma separation membrane.

19. The assay device of claim 1, wherein the fluid sample comprises a whole blood sample when the fluid sample flows in the first flow path and the fluid sample comprises a cell-free plasma sample when the fluid sample flows in the second flow path.

20. The assay device of claim 1, wherein buffer received in the buffer receiving zone does not flow through the first flow path.

21. The assay device of claim 1, wherein the conjugate comprises a label and an antibody or fragment thereof that specifically binds to the analyte of interest.

22. The assay device of claim 1, wherein the label comprises a gold nanoparticle.

23. The assay device of claim 1, wherein the plurality of compression structures further comprises a compression bar positioned at an upstream end of a read window of the cartridge.

24. The assay device of claim 1, wherein a compression structure of the plurality of compression structures is configured to interact with a base support of a base housing of the cartridge, the base support below the bottom surface of the membrane.

* * * * *